US012700679B2

(12) United States Patent
Kim et al.

(10) Patent No.: US 12,700,679 B2
(45) Date of Patent: Aug. 4, 2026

(54) ANTENNA APPARATUS

(71) Applicant: KMW INC., Hwaseong-si (KR)

(72) Inventors: Duk Yong Kim, Yongin-si (KR); Sung Hwan So, Hwaseong-si (KR); Jae Hong Kim, Yongin-si (KR); Bo Sung Kim, Hwaseong-si (KR); Sung Ho Jang, Yongin-si (KR); Yun Ho Lee, Osan-si (KR); Ji Hun Lee, Hwaseong-si (KR); Young Hun Kwon, Suwon-si (KR); Yong Won Seo, Daejeon (KR); Jin Sik Park, Goyang-si (KR); Hyoung Seok Yang, Hwaseong-si (KR); Bae Mook Jeong, Suwon-si (KR); Kyo Sung Ji, Hwaseong-si (KR); Chi Back Ryu, Hwaseong-si (KR)

(73) Assignee: KMW INC., Hwaseong-si (KR)

( * ) Notice: Subject to any disclaimer, the term of this patent is extended or adjusted under 35 U.S.C. 154(b) by 0 days.

(21) Appl. No.: 18/679,499

(22) Filed: May 31, 2024

(65) Prior Publication Data

US 2024/0322449 A1 Sep. 26, 2024

Related U.S. Application Data

(63) Continuation of application No. PCT/KR2022/019514, filed on Dec. 2, 2022.

(30) Foreign Application Priority Data

Dec. 3, 2021 (KR) ........................ 10-2021-0171842
Feb. 25, 2022 (KR) ........................ 10-2022-0024793

(51) Int. Cl.
*H01Q 21/06* (2006.01)
*H01Q 1/24* (2006.01)

(52) U.S. Cl.
CPC ........... *H01Q 21/062* (2013.01); *H01Q 1/246* (2013.01); *H01Q 21/065* (2013.01)

(58) Field of Classification Search
CPC ............ H01Q 1/002; H01Q 1/02; H01Q 1/12; H01Q 1/246; H01Q 1/42; H01Q 19/021;
(Continued)

(56) References Cited

U.S. PATENT DOCUMENTS

2013/0318766 A1 12/2013 Kiple et al.
2020/0335861 A1 10/2020 Lehman et al.

FOREIGN PATENT DOCUMENTS

JP 2020-521344 A 7/2020
JP 2021520140 A * 8/2021 ......... H05K 7/20409
(Continued)

OTHER PUBLICATIONS

International Search Report mailed on Mar. 8, 2023 for International Application No. PCT/KR2022/019514 and its English translation.
(Continued)

*Primary Examiner* — Hoang V Nguyen

(57) ABSTRACT

The present invention relate to an antenna apparatus, and more particularly, to an antenna apparatus including an antenna housing part formed in a form of an enclosure opened at a front side thereof, a board assembly disposed to be tightly attached to an internal space defined by the antenna housing part, and a plurality of antenna RF modules arranged on a front surface of the board assembly, in which the antenna housing part is divided into at least three components, and the components are manufactured and then coupled to one another to prevent distortion caused by thermal stress between upper and lower ends due to a difference in heat generation amount between heating elements mounted on the board assembly, thereby preventing the antenna housing part from being distorted by thermal
(Continued)

stress caused by imbalance of heat generated from the heating elements, and solving a PIMD problem by preventing an unintended movement and clearance of the internal antenna RF modules.

17 Claims, 29 Drawing Sheets

(58) Field of Classification Search
CPC ............ H01Q 21/0025; H01Q 21/061; H01Q 21/062; H01Q 21/065
See application file for complete search history.

(56) References Cited

FOREIGN PATENT DOCUMENTS

| | | | | |
|---|---|---|---|---|
| KR | 10-2017-0070289 A | 6/2017 | | |
| KR | 10-2148016 B1 | 8/2020 | | |
| KR | 10-2020-0132659 A | 11/2020 | | |
| KR | 102290036 B1 * | 8/2021 | ............ | H01Q 21/06 |
| KR | 10-2021-0119315 A | 10/2021 | | |
| KR | 10-2021-0133872 A | 11/2021 | | |

OTHER PUBLICATIONS

Office Action mailed Mar. 11, 2025 from the Japanese Patent Office for Japanese Application No. 2024-531158 and its English translation.
European Search Report dated Dec. 1, 2025 from European Patent Office for Application No. 22901872.6.

* cited by examiner

ANTENNA APPARATUS

CROSS-REFERENCE TO RELATED APPLICATIONS

This application is a continuation application of International Application No. PCT/KR2022/019514, filed Dec. 2, 2022, which claims the benefit of Korean Patent Application Nos. 10-2021-0171842, filed Dec. 3, 2021; and 10-2022-0024793, filed Feb. 25, 2022, in the Korean Intellectual Property Office, the disclosures of which are incorporated herein in their entirety by reference.

TECHNICAL FIELD

The present invention relates to an antenna apparatus, and more particularly, to an antenna apparatus in which an antenna housing part elongated in an upward/downward direction may be divided into components, and the antenna housing part may be manufactured by assembling the components, and unintended movements of internal components, such as antenna RF modules, may be effectively prevented, thereby minimizing deterioration in PIMD properties.

BACKGROUND ART

Base station antennas used for repeaters used in mobile communication systems have various shapes and structures. Typically, the base station antenna has a structure in which a plurality of radiating elements is appropriately disposed on at least one reflective plate standing upright in a longitudinal direction.

Recently, studies have been actively performed to meet high-performance demands for multiple-input multiple-output (MIMO) based antennas and achieve miniaturization, reduction in weight, and low-cost structures. In particular, in the case of an antenna apparatus to which a patch-type radiating element for implementing linearly polarized waves or circularly polarized waves is applied, a method of plating the radiating element, which is typically configured as a dielectric material substrate made of a plastic or ceramic material, and coupling the radiating element to a printed circuit board (PCB) or the like by soldering is widely used.

FIG. 1 is an exploded perspective view illustrating an example of an antenna apparatus in the related art.

As illustrated in FIG. 1, in an antenna apparatus 1 in the related art, a plurality of radiating elements 35 is arranged at a front side of an antenna housing main body 10 in a beam output direction so that beam forming is easily performed as the plurality of radiating elements implements outputs in a desired direction, and a radome 50 is mounted at a front end of the antenna housing main body 10 with the plurality of radiating elements 35 interposed therebetween so as to be protected from an external environment.

More specifically, the antenna apparatus 1 in the related art includes the antenna housing main body 10 opened at a front side thereof, having a rectangular parallelepiped enclosure with a small thickness in a forward/rearward direction, and having a rear surface integrated with a plurality of heat radiating fins 11, a main board 20 stacked and disposed on a rear surface of an interior of the antenna housing main body 10, and an antenna board 30 stacked and disposed on a front surface of the interior of the antenna housing main body 10.

The patch-type or dipole-type radiating elements 35 may be mounted on a front surface of the antenna board 30, and the radome 50 may be installed on the front surface of the antenna housing main body 10 to protect internal components from the outside and allow the radiation from the radiating elements 35 to be smoothly performed.

However, one example of the antenna apparatus 1 in the related art has a structure in which various types of digital elements (FPGA elements, etc.) and analog amplification elements (PA elements, LNA elements, etc.) are concentratively mounted on the main board 20 and radiate heat to a rear side of the antenna housing main body 10.

In this case, among the analog amplification elements, because the LNA element generates a small amount of heat and is mounted together with the main board 20, the LNA element has a problem in that the density of the installation and distribution of the other heating elements on the main board is increased, and the heat generated by the other heating elements directly causes the deterioration in performance.

In addition, a general antenna apparatus has a passive intermodulation distortion (PIMD) problem. The PIMD problem refers to a phenomenon in which a spurious signal, which is generated by non-linear properties of a passive element, degrades signal-to-noise properties in a communication path and degrades the communication quality.

The predetermined or higher quality of the PIMD properties of a dispersion antenna system (DAS), e.g., an antenna system using time domain duplexing (TDD) is maintained during the production, but in industrial sites, the PIMD problem may be caused by the passive elements used for a distribution network from a rear end of an antenna port of remote equipment to a final antenna.

In particular, when modules are not stably fixed in case that the internal components, such as the antenna elements, are structurally designed to be modularized and mounted, the PIMD problem occurs more severely in comparison with the case of integrated mounting.

Further, fine distortion of the antenna housing main body 10 is caused by thermal stress in case that the antenna housing main body 10 is elongated in an upward/downward direction and thermal imbalance is caused by the heating elements mounted on the main board 20. For this reason, the PIMD problem may also be often caused when the components disposed in the internal space of the antenna housing main body 10 are unstably fixed.

DISCLOSURE

Technical Problem

The present invention has been made in an effort to solve the above-mentioned technical problem, and an object of the present invention is to provide an antenna apparatus capable of stably fixing and supporting antenna RF modules manufactured as modularized units so that PIMD properties may be maintained.

Another object of the present invention is to provide an antenna apparatus capable of improving productivity and assemblability of products by modularizing a radiating element part, a left filter part, a right filter part, and an amplification element part so that the radiating element part, the left filter part, the right filter part, and the amplification element part are manufactured as module units and assembled on at least any one of a front surface, left and right side surfaces, and upper and lower surfaces of an RF filter body.

Still another object of the present invention is to provide an antenna apparatus capable of solving a PIMD problem by mitigating thermal stress by dividing an antenna housing part, which substantially performs a heat radiation function, into at least three components, manufacturing the components, and then coupling the components so that the components are subjected to waterproof treatment.

Yet another object of the present invention is to provide an antenna apparatus capable of performing thermal dispersion by separating an amplification part substrate, on which an LNA element, which generates a somewhat small amount of heat among heating elements, is mounted, from a main board and coupling the amplification part substrate to a unit RF filter body.

Technical problems of the present invention are not limited to the aforementioned problems, and other technical problems, which are not mentioned above, may be clearly understood by those skilled in the art from the following descriptions.

Technical Solution

One embodiment of an antenna apparatus according to the present invention includes: an antenna housing part formed in a form of an enclosure opened at a front side thereof; a board assembly disposed to be tightly attached to an internal space defined by the antenna housing part; and a plurality of antenna RF modules arranged on a front surface of the board assembly, in which the antenna housing part is divided into at least three components, and the components are manufactured and then coupled to one another to prevent distortion caused by thermal stress between upper and lower ends due to a difference in heat generation amount between heating elements mounted on the board assembly.

In this case, the antenna housing part may be formed such that a length of a vertical side is at least longer than a length of a horizontal side by a predetermined ratio or higher.

In addition, the antenna housing part may include: a center heat sink panel configured to define an external appearance of an intermediate portion of a rear surface of the antenna apparatus; an upper heat sink panel coupled to an upper portion of the center heat sink panel and configured to define an external appearance of an upper portion of the rear surface of the antenna apparatus; and a lower heat sink panel coupled to a lower portion of the center heat sink panel and configured to define an external appearance of a lower portion of the rear surface of the antenna apparatus, and the center heat sink panel, the upper heat sink panel, and the lower heat sink panel may each be formed such that a length of a vertical side is at least longer than a length of a horizontal side.

In addition, an upper coupling flange and a lower coupling flange, which have a plurality of screw through-holes for screw assembling with the upper heat sink panel and the lower heat sink panel, may be provided at upper and lower ends of the center heat sink panel, and the upper coupling flange and the lower coupling flange of the center heat sink panel may be coupled to each other by using a plurality of assembling screws in a state in which the upper coupling flange and the lower coupling flange of the center heat sink panel are in contact with a lower end of a rear surface of the upper heat sink panel and an upper end of a rear surface of the lower heat sink panel.

In addition, the upper coupling flange and the lower coupling flange of the center heat sink panel may be disposed to respectively overlap the lower end of the rear surface of the upper heat sink panel and the upper end of the rear surface of the lower heat sink panel in a forward/rearward direction and positioned relatively forward of the lower end of the rear surface of the upper heat sink panel and the upper end of the rear surface of the lower heat sink panel.

In addition, the upper coupling flange and the lower coupling flange of the center heat sink panel may be disposed to be respectively recessed toward the inside of the lower end of the rear surface of the upper heat sink panel and the inside of the upper end of the rear surface of the lower heat sink panel.

In addition, a coupling portion between the center heat sink panel and the upper heat sink panel and a coupling portion between the center heat sink panel and the lower heat sink panel may be subjected to waterproof treatment.

In addition, the plurality of antenna RF modules may have a plurality of unit RF filter bodies disposed side by side in several rows or several columns in a vertical upward/downward direction (hereinafter, referred to as a 'V-direction') and a horizontal leftward/rightward direction (hereinafter, referred to as an 'H-direction'), and the antenna apparatus may further include a plurality of fixing members configured to mediate fixing of the antenna RF module to the antenna housing part.

In addition, the plurality of fixing members may include: a horizontal fixing bar configured to provide module fixing screw holes to which the plurality of unit RF filter bodies is fixed in a screw coupling manner; and a plurality of fixing legs extending rearward from the horizontal fixing bar and each having a rear end fixed to a front surface of the antenna housing part or the board assembly.

In addition, one side fixing leg and the other side fixing leg, which are formed at two opposite ends among the plurality of fixing legs, may be fixed, in a screw coupling manner, to an edge mounting block provided on an inner edge portion of the antenna housing part, and a center fixing leg, which is formed between one side fixing leg and the other side fixing leg among the plurality of fixing legs, may be fixed, in a screw coupling manner, to a board mounting block provided on the front surface of the board assembly.

In addition, the plurality of antenna RF modules may include: the unit RF filter body; a plurality of radiating element modules provided to protrude toward a front side of the unit RF filter body; and a reflector panel integrally formed at a front end of the unit RF filter body so as to have a larger area than a front surface of the unit RF filter body and configured to reflect radio waves, which are radiated from the plurality of radiating element modules, forward, and the plurality of antenna RF modules may be fixed by an operation of fastening a filter fixing screw, which is formed through the reflector panel from a front side to a rear side, to a module fixing screw hole of the horizontal fixing bar provided at a rear side of the reflector panel.

In addition, the plurality of antenna RF modules may further include: an amplification element part provided on any one of upper and lower surfaces that are front and rear thickness portions of the unit RF filter body, the amplification element part including an LNA substrate part on which at least one analog amplification element is mounted; and a filter connecting part provided on a rear surface portion of the unit RF filter body and electrically connected to the board assembly, and a male socket part, which is formed on the LNA substrate part, and the filter connecting part may be simultaneously connected to a pin coupling part and a female socket part provided on the front surface of the board assembly when the unit RF filter body is fixed to the horizontal fixing bar by screw fastening.

In addition, the antenna housing part may further include four side housing panels respectively connected to front ends of the center heat sink panel, the upper heat sink panel, and the lower heat sink panel and configured to define external appearances of left and right side portions and upper and lower side portions of the antenna apparatus, and the plurality of fixing members may include a horizontal fixing bar having two opposite ends respectively fixed to inner surfaces of left and right housing panels configured to define an external appearance of a left portion and an external appearance of a right portion of the antenna apparatus among the four side housing panels.

In addition, the antenna apparatus may further include: a radome panel coupled to the front surface of the antenna housing part to shield an opened front side of the antenna housing part, in which a plurality of support bosses is formed on a rear surface of the radome panel and extends and protrudes rearward to support a front end of the horizontal fixing bar.

In addition, a plurality of rear heat radiating fins may be provided on rear surfaces of the center heat sink panel, the upper heat sink panel, and the lower heat sink panel to increase a heat radiation surface area of heat generated from the heating elements in the internal space, and at least some of the plurality of rear heat radiating fins may be separately manufactured and coupled to coupling heat sink ribs integrally formed on rear surface portions of the heat sink panels.

In addition, the four side housing panels and the radome panel may be made of the same material.

In addition, the plurality of fixing members may be supported by the plurality of support bosses of the radome panel in a state in which a buffer part made of a silicone rubber material is interposed between the plurality of fixing members and the rear surface of the radome panel.

Advantageous Effects

The embodiment of the antenna apparatus according to the present invention may achieve the following various effects.

First, the filter part, the radiating element part, and the amplification part are manufactured and assembled as the single module unit, and the fixing member is further provided, which may solve the general PIMD problem of the antenna apparatus.

Second, the left filter part and the right filter part, which may independently perform frequency filtering, are provided at the left and right sides of the unit RF filter body, which may improve the productivity of the dual band filter.

Third, among the heating elements of the antenna apparatus, the LNA element, which generates a relatively small amount of heat and is provided in the reception signal path that does not affect the entire system, is provided and disposed to be separated from the main board, which may improve the overall heat radiation performance.

The effects of the present invention are not limited to the aforementioned effects, and other effects, which are not mentioned above, will be clearly understood by those skilled in the art from the claims.

EXPLANATION OF REFERENCE NUMERALS AND SYMBOLS

Figure 1:
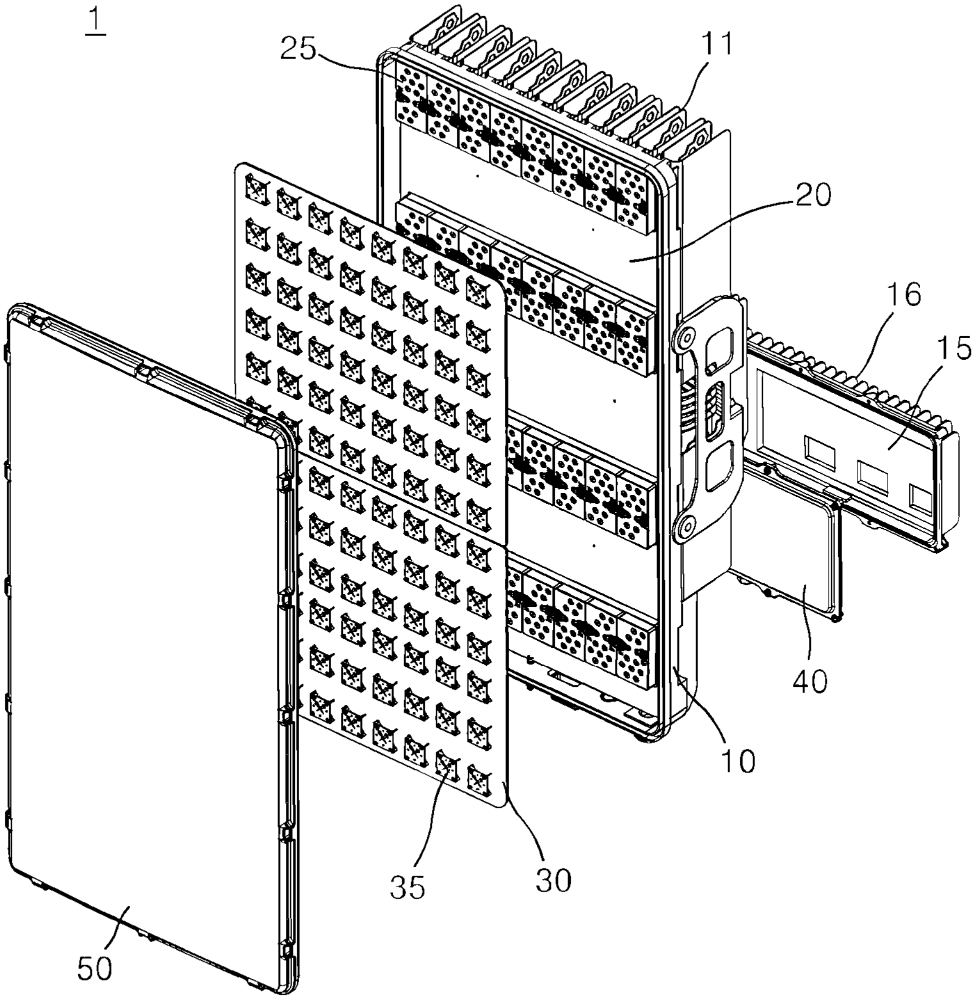
FIG. 1 is an exploded perspective view illustrating an example of an antenna apparatus in the related art.

100: Antenna apparatus
110: Antenna housing part
110S: Internal space
111: Rear heat radiating fin

120: Main board
127: Female socket part
130: PSU board part
140: RFIC substrate part
150: Surge substrate part
200: Antenna RF module
210: Unit RF filter body
220: Radiating element part
230: Amplification element part
270: Reflector panel

BEST MODE

Hereinafter, an antenna RF module and an antenna apparatus including the same according to an embodiment of the present invention will be described in detail with reference to the accompanying drawings.

In giving reference numerals to constituent elements of the respective drawings, it should be noted that the same constituent elements will be designated by the same reference numerals, if possible, even though the constituent elements are illustrated in different drawings. Further, in the following description of the embodiments of the present invention, a detailed description of related publicly-known configurations or functions will be omitted when it is determined that the detailed description obscures the understanding of the embodiments of the present invention.

In addition, the terms first, second, A, B, (a), and (b) may be used to describe constituent elements of the embodiments of the present invention. These terms are used only for the purpose of discriminating one constituent element from another constituent element, and the nature, the sequences, or the orders of the constituent elements are not limited by the terms. Further, unless otherwise defined, all terms used herein, including technical or scientific terms, have the same meaning as commonly understood by those skilled in the art to which the present invention pertains. The terms such as those defined in commonly used dictionaries should be interpreted as having meanings consistent with meanings in the context of related technologies and should not be interpreted as ideal or excessively formal meanings unless explicitly defined in the present application.

Figure 2:
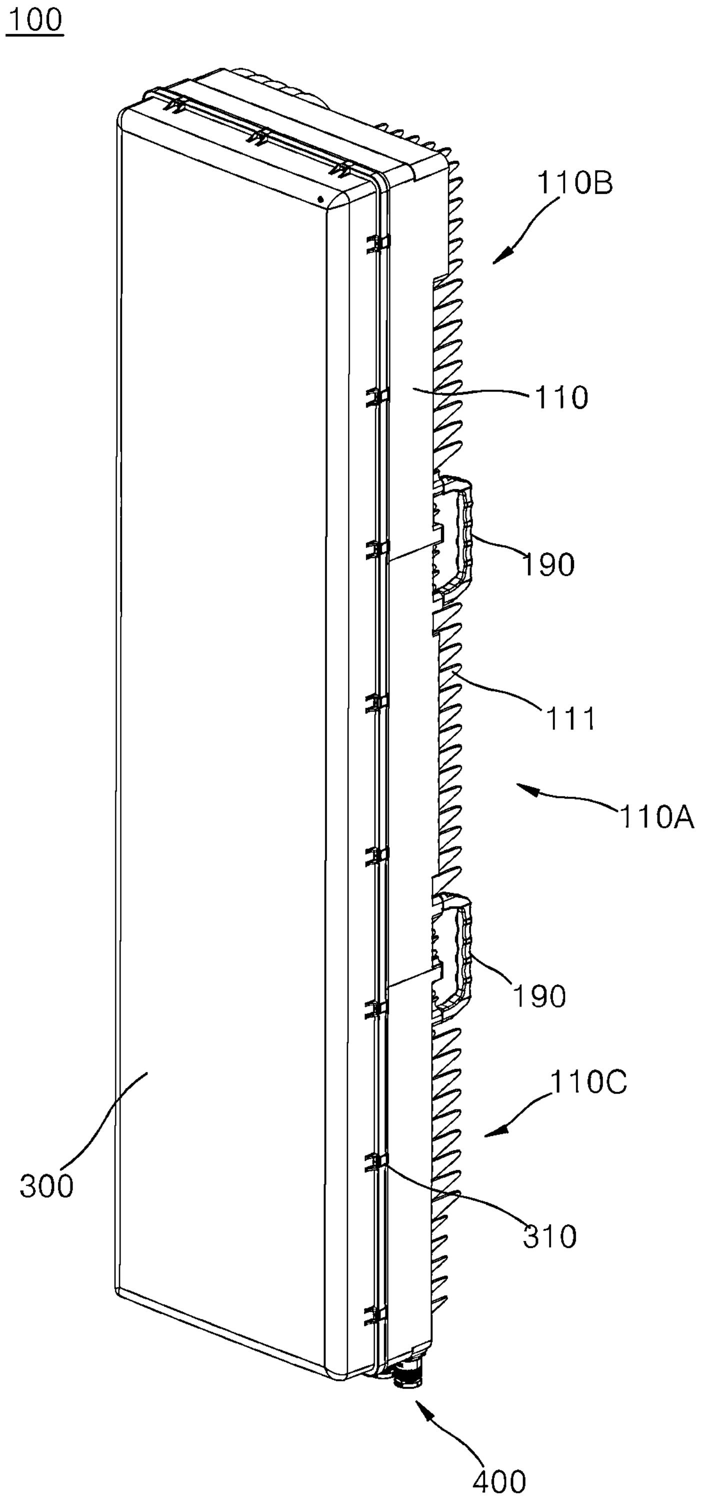
FIG. 2 is a perspective view illustrating an antenna apparatus according to an embodiment of the present invention.
Figure 3A:
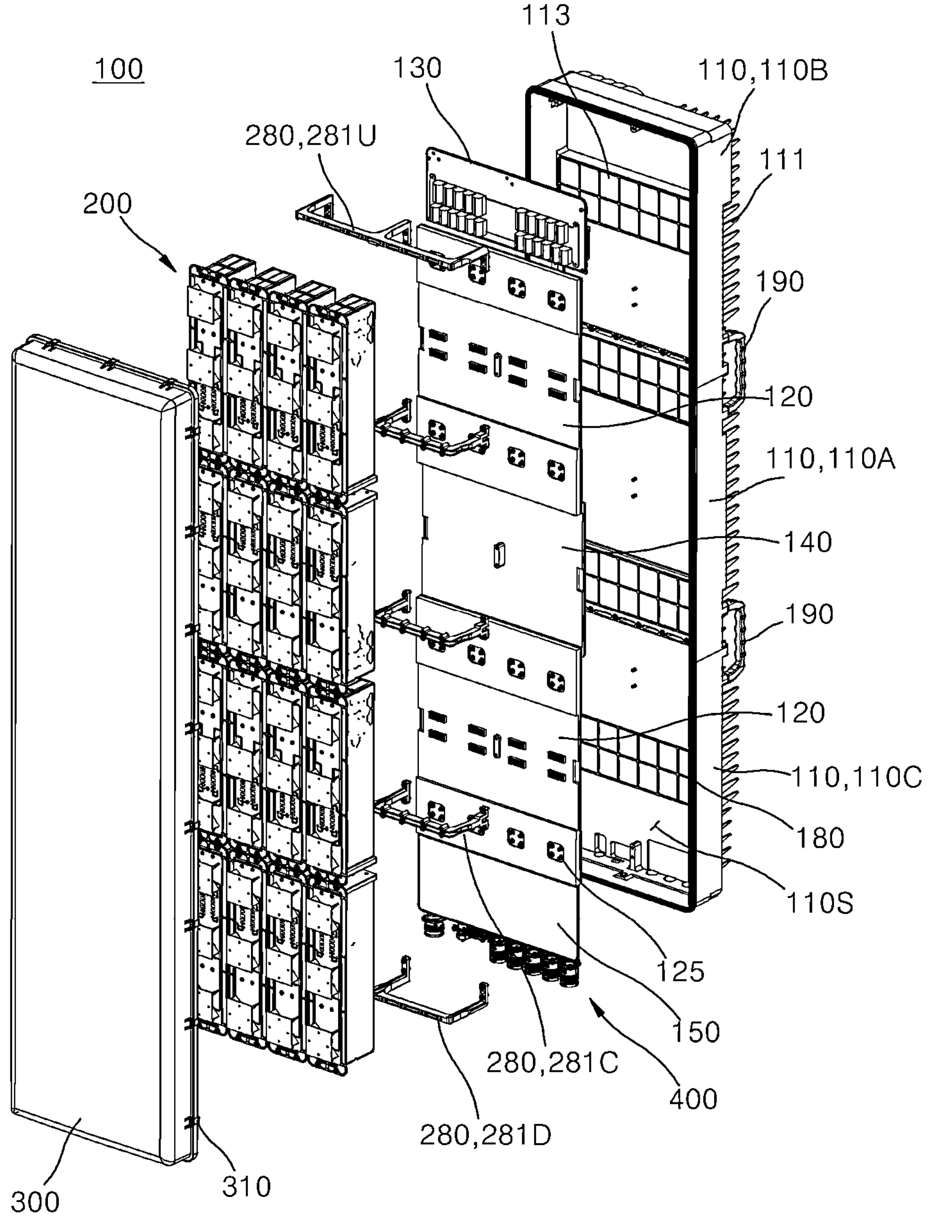
FIGS. 3A and 3B are exploded front and rear side perspective views illustrating of the entire configuration in FIG. 2.
Figure 3B:
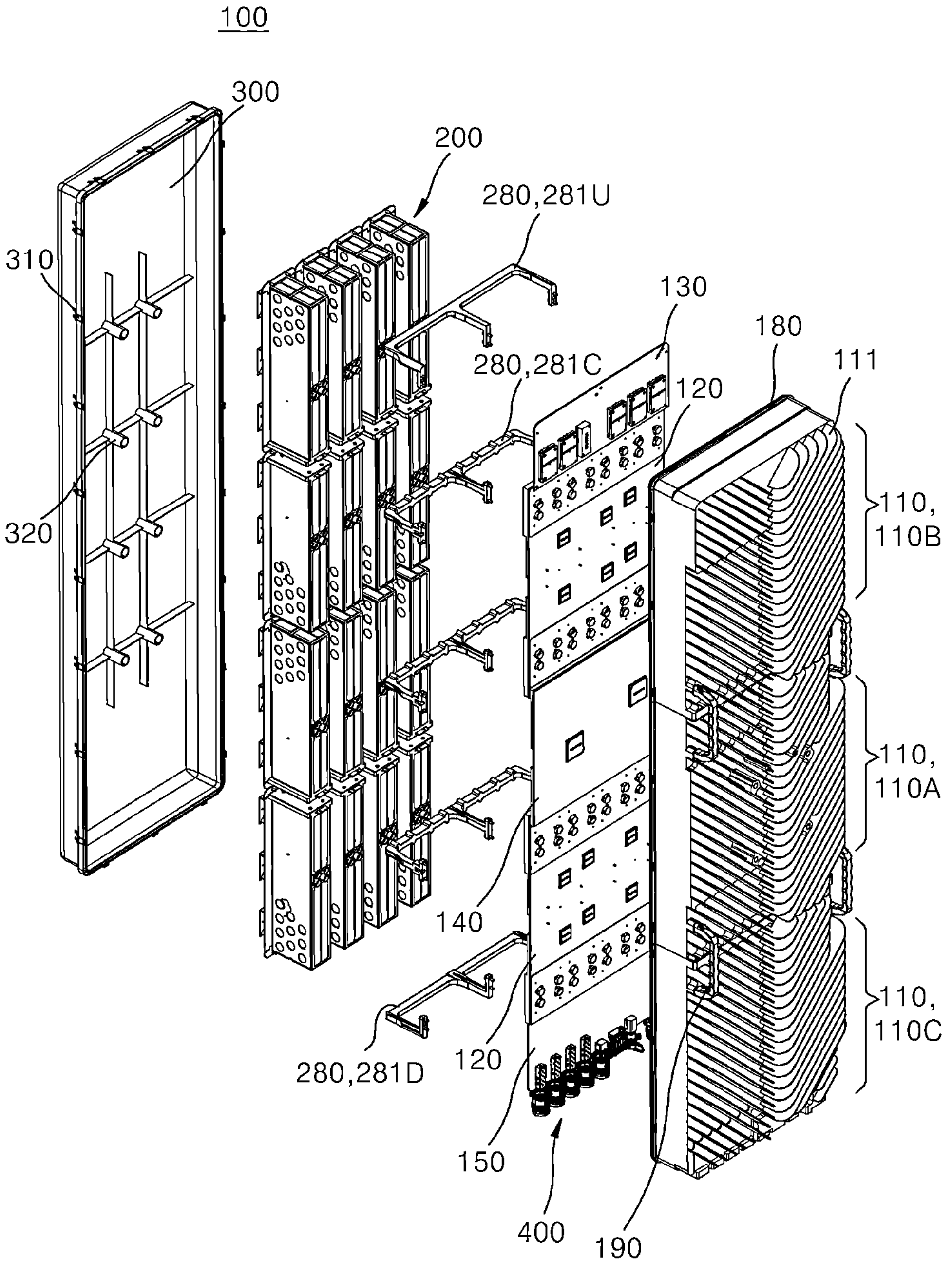
Figure 4A:
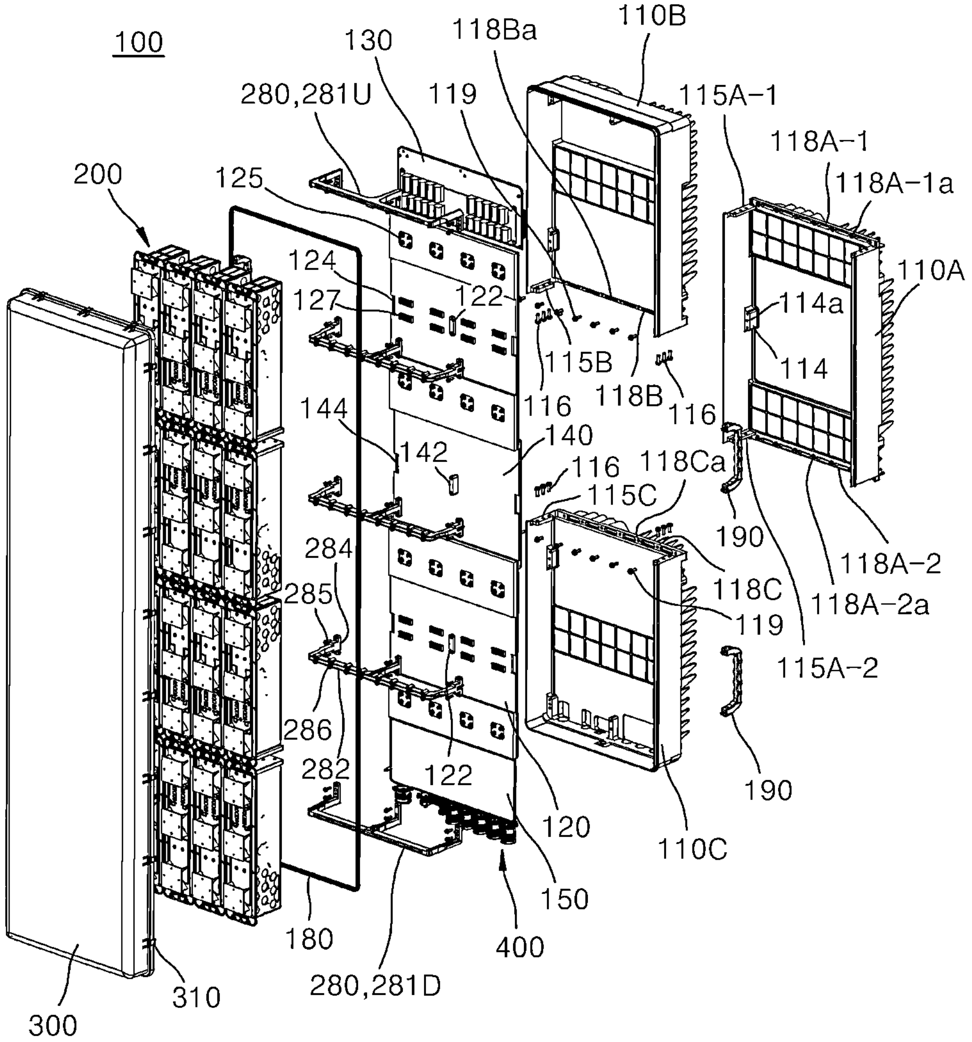
FIGS. 4A and 4B are exploded front and rear side perspective views for explaining a process of installing an antenna RF module on a board assembly, among the components in FIGS. 3A and 3B and explaining a detailed configuration of an antenna housing part.
Figure 4B:
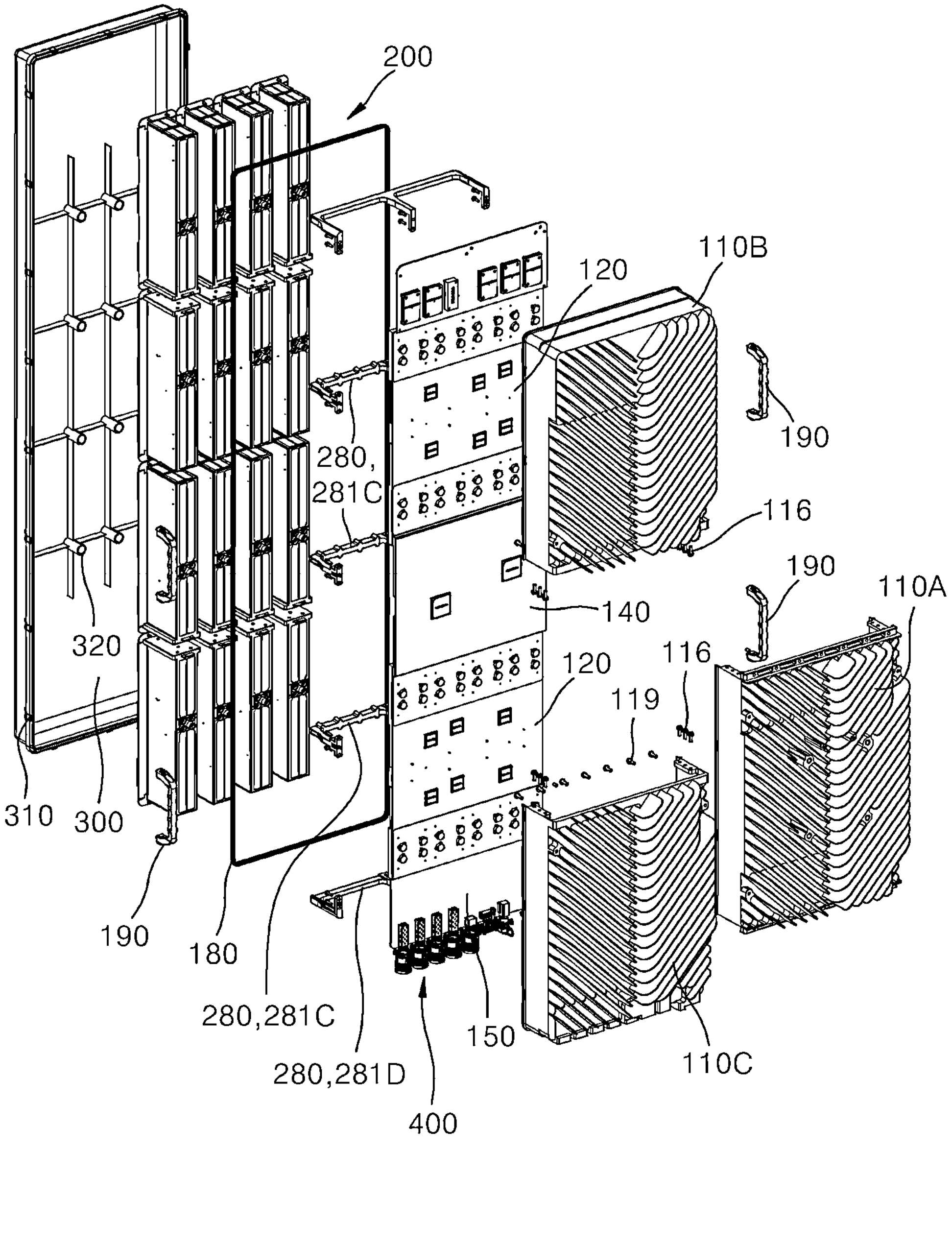

FIG. 2 is a perspective view illustrating an antenna apparatus according to an embodiment of the present invention, FIGS. 3A and 3B are exploded front and rear side perspective views illustrating of the entire configuration in FIG. 2, and FIGS. 4A and 4B are exploded front and rear side perspective views for explaining a process of installing an antenna RF module on a board assembly, among the components in FIGS. 3A and 3B.

As illustrated in FIGS. 2 to 4B, an antenna apparatus 100 according to an embodiment of the present invention includes an antenna housing part 110 configured to define external appearances of left and right sides and a rear side of the antenna apparatus 100, and a radome panel 300 configured to define an external appearance of a front side of the antenna apparatus 100, shield an opened front side of the antenna housing part 110, and protect internal components (including a board assembly, such as main boards 120, an antenna RF module 200, and the like to be described below), which are provided in an internal space 110S of the antenna housing part 110, from the outside.

In addition, as illustrated in FIGS. 2 to 4B, the antenna apparatus 100 according to the embodiment of the present invention may further include the board assembly (see reference numerals 120, 130, 140, and 150) installed to be tightly attached to the internal space 110S of the antenna housing part 110.

The board assembly may include the pair of main boards 120 each having a front or rear surface on which various types of electrical elements are mounted and disposed, the pair of main boards 120 being disposed to be spaced apart from each other at a predetermined distance in an upward/downward direction, a PSU board part 130 disposed above the main board 120 and configured to control a supply of power, a middle substrate part provided between the pair of main boards 120, and a surge substrate part 150 disposed below the main board 120. In accordance with manufacturing specifications, the middle substrate part may be an RFIC substrate part 140, on which an RFIC component is mounted, or a beamer substrate part on which a beamer is mounted.

In addition, the embodiment of the present invention may further include the antenna radio frequency (RF) module 200 (hereinafter, simply referred to as an 'RF module') stacked and disposed on the front surface of the board assembly including the main board 120.

Although not illustrated, the antenna housing part 110 may serve to mediate coupling with respect to a strut pole provided to install the antenna apparatus 100.

The antenna housing part 110 may be made of a metallic material excellent in thermal conductivity to make it advantageous to radiate heat in accordance with overall thermal conduction and formed in a rectangular parallelepiped enclosure having a thickness in a forward/rearward direction to the extent that a front end of the RF module 200 to be described below may be accommodated.

Meanwhile, an inner surface of the antenna housing part 110 may be formed in a shape matched with protruding external shapes of digital elements (FPGA elements and the like) mounted on a rear surface of the main board 120, PSU elements and the like mounted on a rear surface of the PSU board part 130, the RFIC component, the beamer, or the like mounted on a rear surface of the RFIC substrate part 140, and/or surge component elements mounted on a rear surface of the surge substrate part 150. This is to maximize heat radiation performance by maximally increasing a thermal contact area with the rear surfaces of the main board 120, the PSU board part 130, the RFIC substrate part 140, and the surge substrate part 150.

Further, female socket parts 127 may be provided on the front surface of the main board 120, and male socket parts 235, which are formed on an LNA substrate part 231 of an amplification element part 230 among the components of the antenna RF module 200 manufactured as a module unit to be described below, may be coupled to the female socket parts 127 in a socket pin coupling manner.

In addition, pin coupling parts 125 may be provided on the front surface of the main board 120, and first connecting pin terminals 281 of a left filter part 240A and a right filter part 240B to be described below, among the components of the antenna RF module 200, may be coupled to the pin coupling parts 125 in a terminal pin coupling manner.

Hereinafter, the antenna apparatus 100 according to the embodiment of the present invention may further include a second connecting pin terminal 282 and a third connecting pin terminal 283 for electrical connection between two components (members), like the first connecting pin terminal 281 (see FIGS. 14A to 14D). For convenience of description, the first to third connecting pin terminals 281, 282, and 283 will be collectively and simply referred to as filter connecting parts and described.

As illustrated in FIGS. 2 to 4B, handle parts 190 may be further installed on two opposite left and right sides of the antenna housing part 110 so that an operator, on site, may grip the handle parts 190 to easily transport the antenna apparatus 100 according to the embodiment of the present invention or easily manually mount the antenna apparatus 100 on the strut pole (not illustrated).

Further, various types of outer mounting members 400 may be penetratively assembled to an outer side of a lower end of the antenna housing part 110 to connect a cable to a non-illustrated base station apparatus and adjust the internal components. The outer mounting member 400 may have at least one optical cable connection terminal (socket) shape, and a connection terminal of a coaxial cable (not illustrated) may be connected to the connection terminal.

In this case, as illustrated in FIGS. 2 to 4B, the antenna housing part 110 may have a shape in which a length of a vertical side is at least three or more times longer than a length of a horizontal side, and the antenna housing part 110 may be elongated in the upward/downward direction.

This is a result of adopting an optimal shape for increasing the length in the upward/downward direction, instead of increasing a width in a leftward/rightward direction, in order to concentratively arrange a larger number of antenna radiating elements to ensure a high-capacity transmission channel required recently, and minimize interference with surrounding antenna apparatuses at the time of setting directionality by means of tilting and steering.

In case that the antenna housing part 110 is elongated in the upward/downward direction as described above, there is no problem when heat generated from the elements (heating elements, e.g., FPGA elements, PA (Tx_amp) elements, etc.) of the main board 120, the PSU board 130, the RFIC board 140, and the surge substrate part 150 disposed on the internal space 110S is uniformly distributed. However, the antenna housing part 110 may be finely distorted by thermal stress applied to the antenna housing part 110 by imbalanced distribution of heat generated from the heating elements, and the distortion may cause a PIMD problem of the antenna apparatus 100.

The PIMD (passive intermodulation distortion) problem of the antenna apparatus 100 occurs as a spurious signal, which is generated by non-linear properties of a passive element, degrades signal-to-noise properties a in communication path and degrades the communication quality.

In order to prevent the PIMD problem, as illustrated in FIGS. 4A and 4B, in the antenna apparatus 100 according to the embodiment of the present invention, the antenna housing part 110 may be divided into at least three components, and the components may be manufactured and then coupled to one another to prevent distortion due to thermal stress between upper and lower ends caused by a difference in heat generation amount between the heating elements mounted on the main board 120 and the like.

Figure 5:
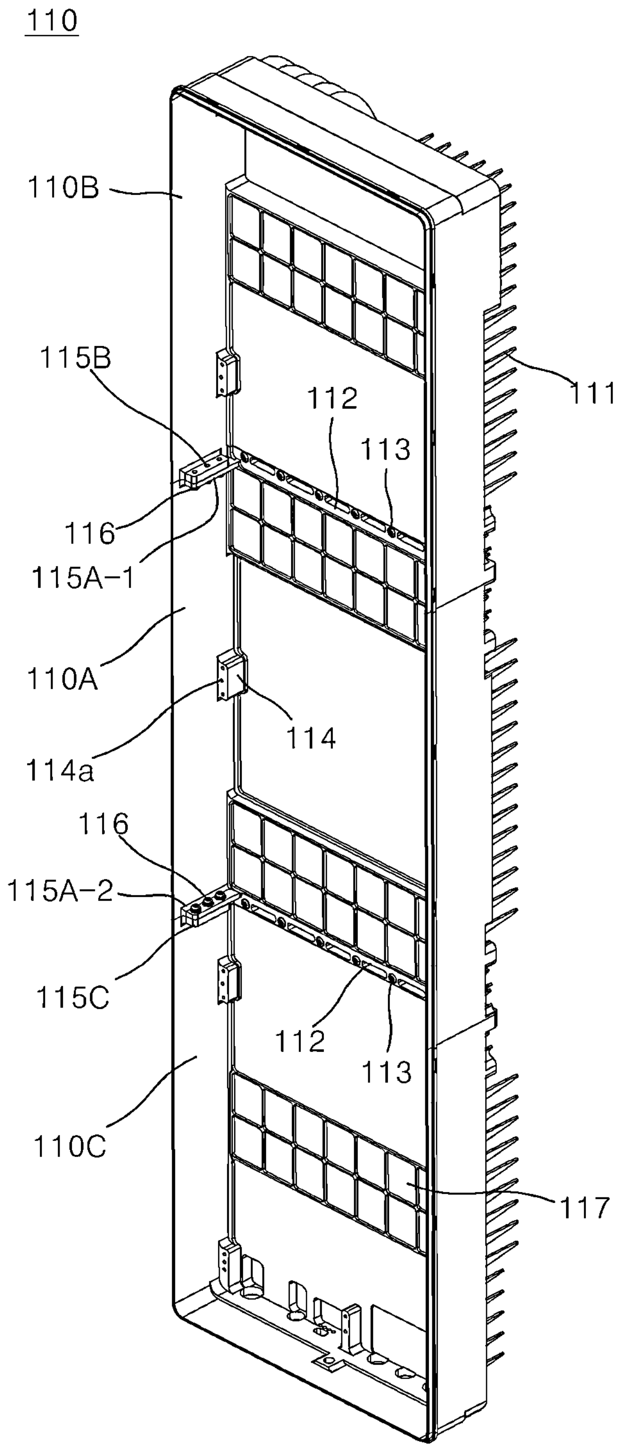
FIG. 5 is a perspective view illustrating the antenna housing part according to the embodiment of the present invention.
Figure 6A:
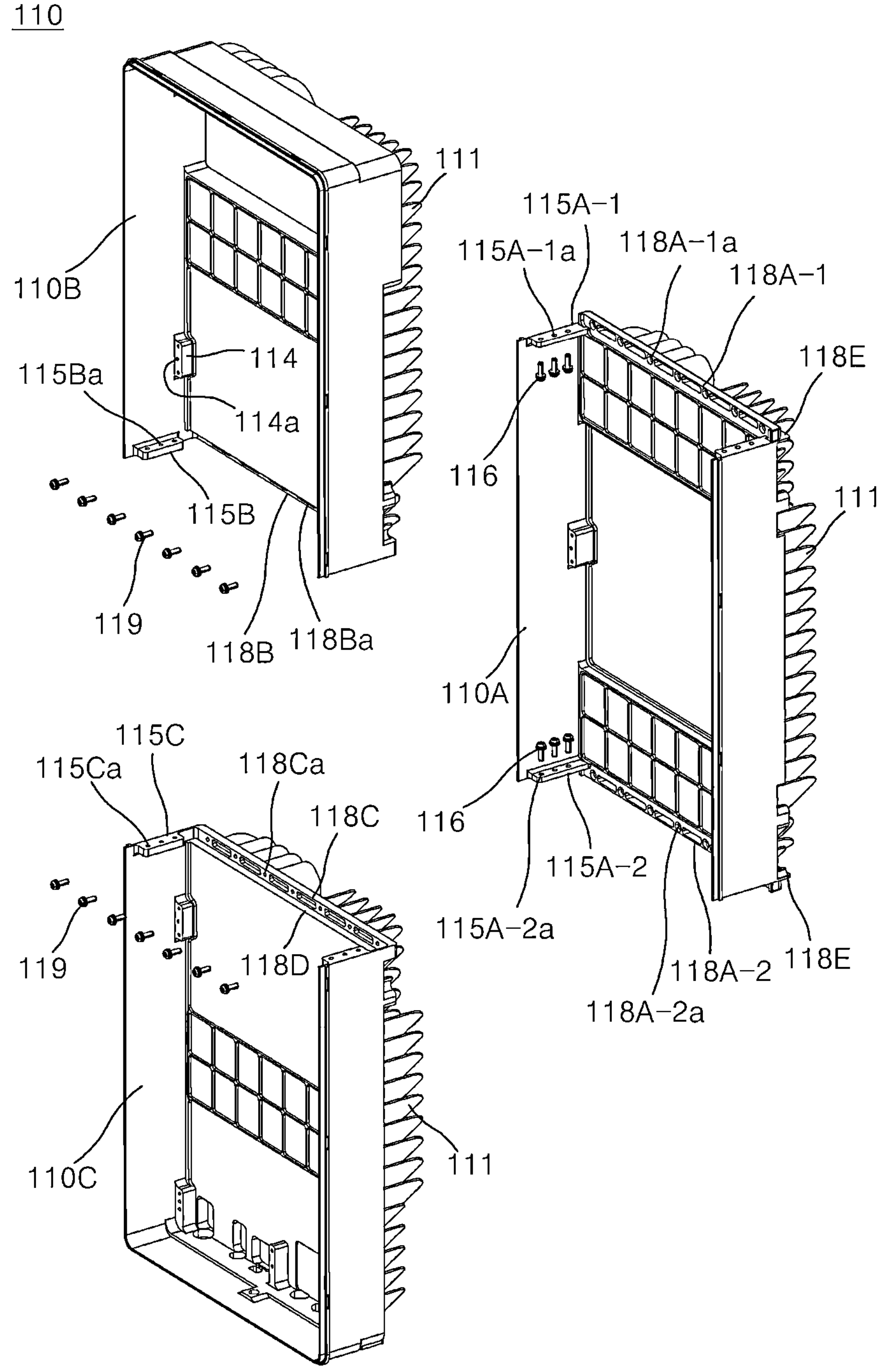
FIGS. 6A and 6B are exploded front and rear side perspective views illustrating the antenna housing part in FIG. 5.
Figure 6B:
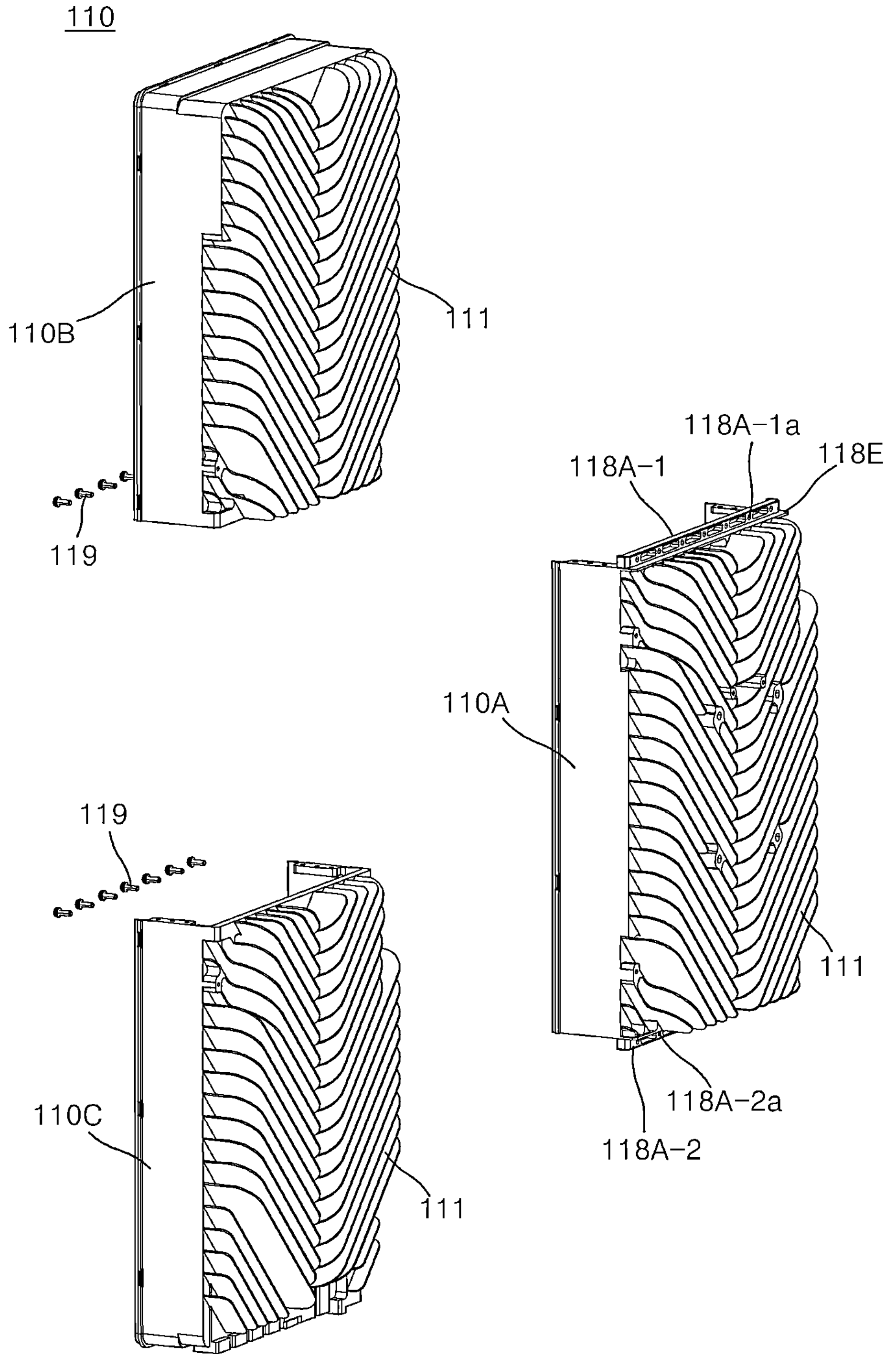

FIG. 5 is a perspective view illustrating the antenna housing part according to the embodiment of the present invention, and FIGS. 6A and 6B are exploded front and rear side perspective views illustrating the antenna housing part in FIG. 5.

More specifically, as illustrated in FIG. 5, the antenna housing part 110 may include a center heat sink panel 110A configured to define an external appearance of an intermediate portion of the rear surface of the antenna apparatus 100, an upper heat sink panel 110B coupled to an upper portion of the center heat sink panel 110A and configured to define an external appearance of an upper portion of the rear surface of the antenna apparatus 100, and a lower heat sink panel 110C coupled to a lower portion of the center heat sink panel 110A and configured to define an external appearance of a lower portion of the rear surface of the antenna apparatus 100.

In this case, on the premise that the antenna housing part 110 is formed so that the length of the vertical side is at least three or more times longer than the length of the horizontal side as described above, the center heat sink panel 110A, the upper heat sink panel 110B, and the lower heat sink panel 110C are each formed so that a length of a vertical side is at least longer than a length of a horizontal side even in case that the antenna housing part 110 is divided into the three components. However, the protection scope of the antenna apparatus 100 according to the embodiment of the present invention is not limited thereto. The protection scope, of course, also includes a case in which the antenna housing part 110 is divided into two components within a range in which the length of the vertical side is at least longer than the length of the horizontal side.

Meanwhile, an upper coupling flange 118A-1 and a lower coupling flange 118A-2 having a plurality of screw through-holes 118A-1*a* and 118A-2*a* for screw assembling with the upper heat sink panel 110B and the lower heat sink panel 110C are provided at the upper and lower ends of the center heat sink panel 110A. The upper coupling flange 118A-1 and the lower coupling flange 118A-2 of the center heat sink panel 110A may be coupled to each other as a plurality of assembling screws 119 penetrates the plurality of screw through-holes 118A-1*a* and 118A-2*a* and then is fastened to a plurality of screw fastening holes 118Ba and 118Ca formed in an upper corresponding flange 118B and a lower corresponding flange 118C in a state in which the upper coupling flange 118A-1 and the lower coupling flange 118A-2 of the center heat sink panel 110A are respectively in contact with the upper corresponding flange 118B formed at a lower end of a rear surface of the upper heat sink panel 110B and the lower corresponding flange 118C formed at an upper end of a rear surface of the lower heat sink panel 110C.

In this case, the upper coupling flange 118A-1 and the lower coupling flange 118A-2 of the center heat sink panel 110A may be disposed to respectively overlap the lower end of the rear surface of the upper heat sink panel 110B and the upper end of the rear surface of the lower heat sink panel 110C in the forward/rearward direction and positioned relatively forward of the lower end of the rear surface of the upper heat sink panel 110B and the upper end of the rear surface of the lower heat sink panel 110C.

In this case, the upper coupling flange 118A-1 and the lower coupling flange 118A-2 of the center heat sink panel 110A may be respectively disposed to be recessed toward the inside of the upper corresponding flange 118B at the lower end of the rear surface of the upper heat sink panel 110B and the inside of the lower corresponding flange 118C at the upper end of the lower heat sink panel 110C.

The plurality of screw through-holes 118A-1*a* and 118A-2*a*, which may be penetrated by the assembling screws 119, may be formed in the upper coupling flange 118A-1 and the lower coupling flange 118A-2 of the center heat sink panel 110A and spaced apart from one another in the leftward/rightward direction, and the housing fixing screw fastening holes 118Ba and 118Ca, to which the assembling screws 119 are fastened, may be formed in the upper corresponding flange 118B of the upper heat sink panel 110B and the lower corresponding flange 118C of the lower heat sink panel 110C.

Further, an upper sidewall fixing block 115A-1 and a lower sidewall fixing block 115A-2 may be respectively formed on left and right sidewall portions at the upper and lower ends of the center heat sink panel 110A, and sidewall fixing screw through-holes 115A-1*a* and 115A-2*a*, which are penetrated by a plurality of sidewall fixing screws 116, may be respectively formed in the upper sidewall fixing block 115A-1 and the lower sidewall fixing block 115A-2.

Further, an upper corresponding sidewall fixing block 115B and a lower corresponding sidewall fixing block 115C, which respectively correspond to the upper sidewall fixing block 115A-1 and the lower sidewall fixing block 115A-2 of the center heat sink panel 110A may be formed on left and right sidewalls at the lower ends or the upper ends of the upper heat sink panel 110B and the lower heat sink panel 110C, and a plurality of sidewall fixing screw fastening holes 115Ba and 115Ca, to which sidewall fixing screws 116 are fastened, may also be formed in the upper corresponding sidewall fixing block 115B and the lower corresponding sidewall fixing block 115C.

That is, the three heat sink panels 110A, 110B, and 110C, which constitute the antenna housing part 110, are securely screw-assembled at the rear end and the left and right sidewall portions, such that the single antenna housing part 110 may be configured.

Therefore, even though the heat generated from the internal space 110S of the antenna housing part 110 is not uniform, the three components of the antenna housing part 110 radiate heat, such that thermal stress may be minimized, which may prevent the distortion of the antenna housing part 110 and solve the PIMD problem.

In this case, because the antenna housing part 110 is exposed to the outside, a coupling portion between the center heat sink panel 110A and the upper heat sink panel 110B and a coupling portion between the center heat sink panel 110A and the lower heat sink panel 110C may be subjected to waterproof treatment to prevent a leak (penetration) of foreign substances, such as rainwater, into the internal space 110S.

With reference to FIGS. 2 to 6B, a plurality of rear heat radiating fins 111 may be integrally formed on the rear surface of the antenna housing part 110 so as to have a predetermined pattern shape. In this case, with the board assembly installed in the internal space 110S of the antenna housing part 110, the heat generated from the heating elements of the main board 120, the PSU board 130, the RFIC substrate part 140, and the surge substrate part 150 may be directly radiated rearward through the plurality of rear heat radiating fins 111.

As illustrated in FIGS. 2 to 6B, the plurality of rear heat radiating fins 111 is disposed to be inclined upward toward the left and right ends thereof based on a middle portion based on a width in a leftward/rightward direction and designed so that the heat radiated toward the rear side of the antenna housing part 110 is more quickly dispersed while forming an ascending gas flow dispersed in the leftward and rightward directions. However, the shapes of the plurality of rear heat radiating fins 111 are not necessarily limited thereto. For example, although not illustrated in the drawings, in case that a blower fan module (not illustrated) is further provided at the rear side of the antenna housing part 110 to make a flow of outside air smooth, the plurality of rear heat radiating fins 111 may be formed in parallel at the left and right ends of the blower fan module disposed at the middle portion so that the heat radiated by the blower fan module is more quickly discharged.

Meanwhile, as illustrated in FIGS. 2 to 4B, the antenna apparatus 100 according to the embodiment of the present invention may further include the radome panel 300 coupled to the front surface of the antenna housing part 110 to shield the opened front side of the antenna housing part 110.

The radome panel 300 may be coupled to the front end of the antenna housing part 110, and a hook engagement part 310 formed along a rim of the radome panel 300 may hook-engage with a catching rib (no reference numeral) at the front end of the antenna housing part 110.

In this case, a waterproof gasket ring 180 made of a rubber material may be interposed between a front end rim of the antenna housing part 110 and the radome panel 300 and perform a sealing function as the waterproof gasket ring 180 is elastically deformed by a coupling force provided during the hook engagement of the radome panel 300 with the antenna housing part 110.

Meanwhile, as illustrated in FIGS. 3A to 4B, the antenna apparatus 100 according to the embodiment of the present invention may further include a plurality of fixing members 280 configured to fix unit RF filter bodies 210 of the RF module 200 when the antenna RF module 200 is installed.

Figure 7:
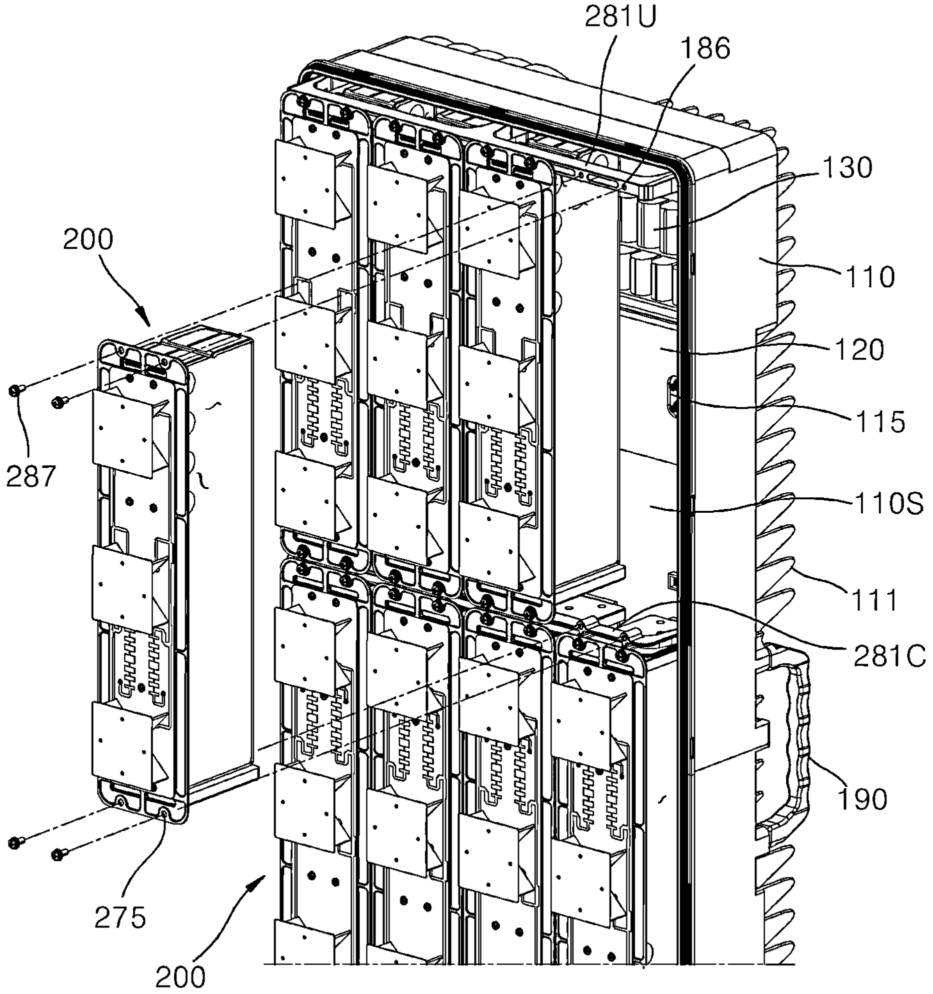
FIG. 7 is an exploded perspective view for explaining a process of installing the antenna RF module on a fixing member among the components in FIGS. 3A and 3B.

FIG. 7 is an exploded perspective view for explaining a process of installing the antenna RF module on the fixing member among the components in FIGS. 3A and 3B, and FIGS. 8 and 9 are a perspective view and an exploded perspective view for explaining a process of installing the fixing member and the antenna RF module on the board assembly among the components in FIGS. 3A and 3B.

As illustrated in FIGS. 4A and 4B, the plurality of fixing members 280 may include an upper fixing part 281U provided at an uppermost end of the internal space 110S of the antenna housing part 110, a down fixing part 281D provided at a lowermost end of the internal space 110S of the antenna housing part 110, and at least one center fixing part 281C fixed to the internal space 110S of the antenna housing part 110 corresponding to a portion between the upper fixing part 281U and the down fixing part 281D.

The upper fixing part 281U and the down fixing part 281D may be disposed one by one horizontally so as to be respectively adjacent to the upper and lower ends of the antenna housing part 110, and the three center fixing parts 281C may be disposed horizontally so as to be spaced apart from one another in the upward/downward direction between the upper fixing part 281U and the down fixing part 281D.

Figure 8:
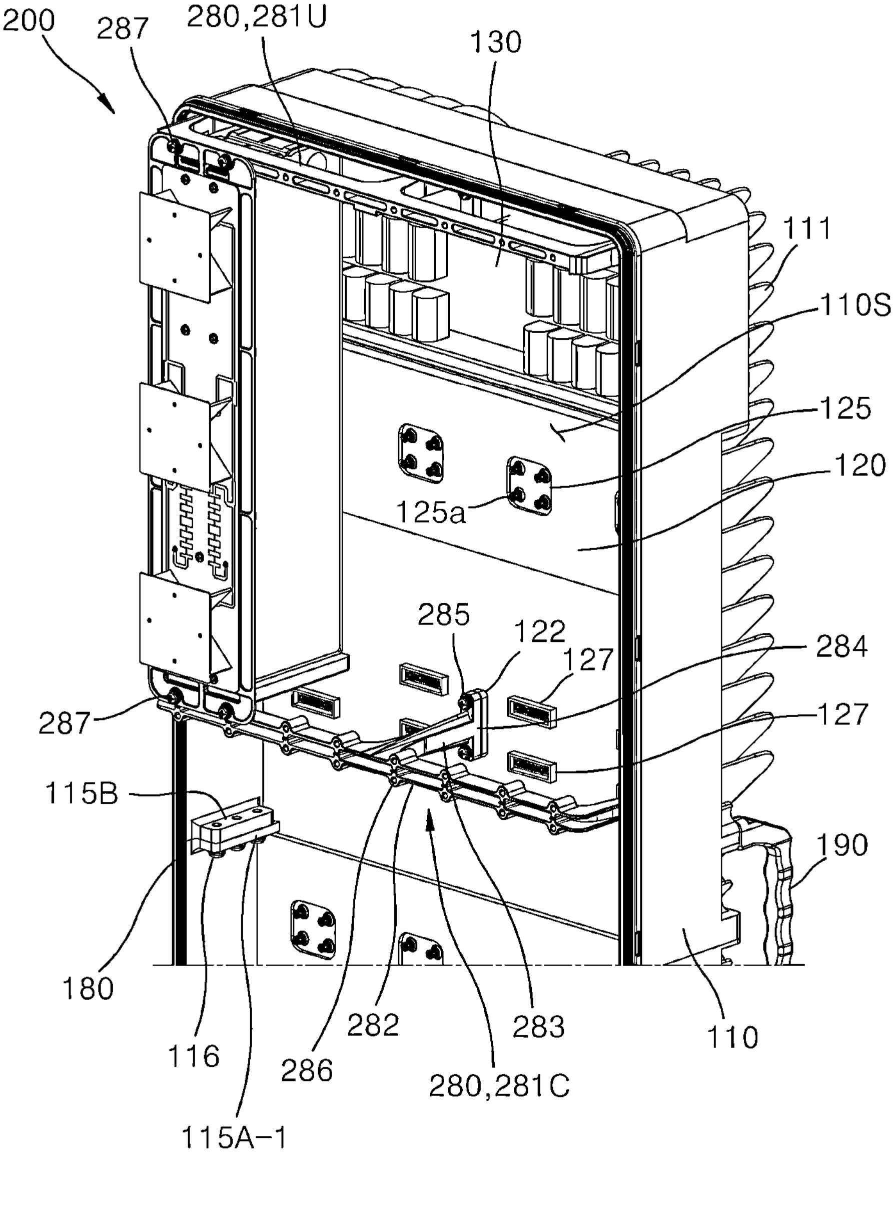
FIGS. 8 and 9 are a perspective view and an exploded perspective view for explaining a process of installing the fixing member and the antenna RF module on the board assembly among the components in FIGS. 3A and 3B.
Figure 9:
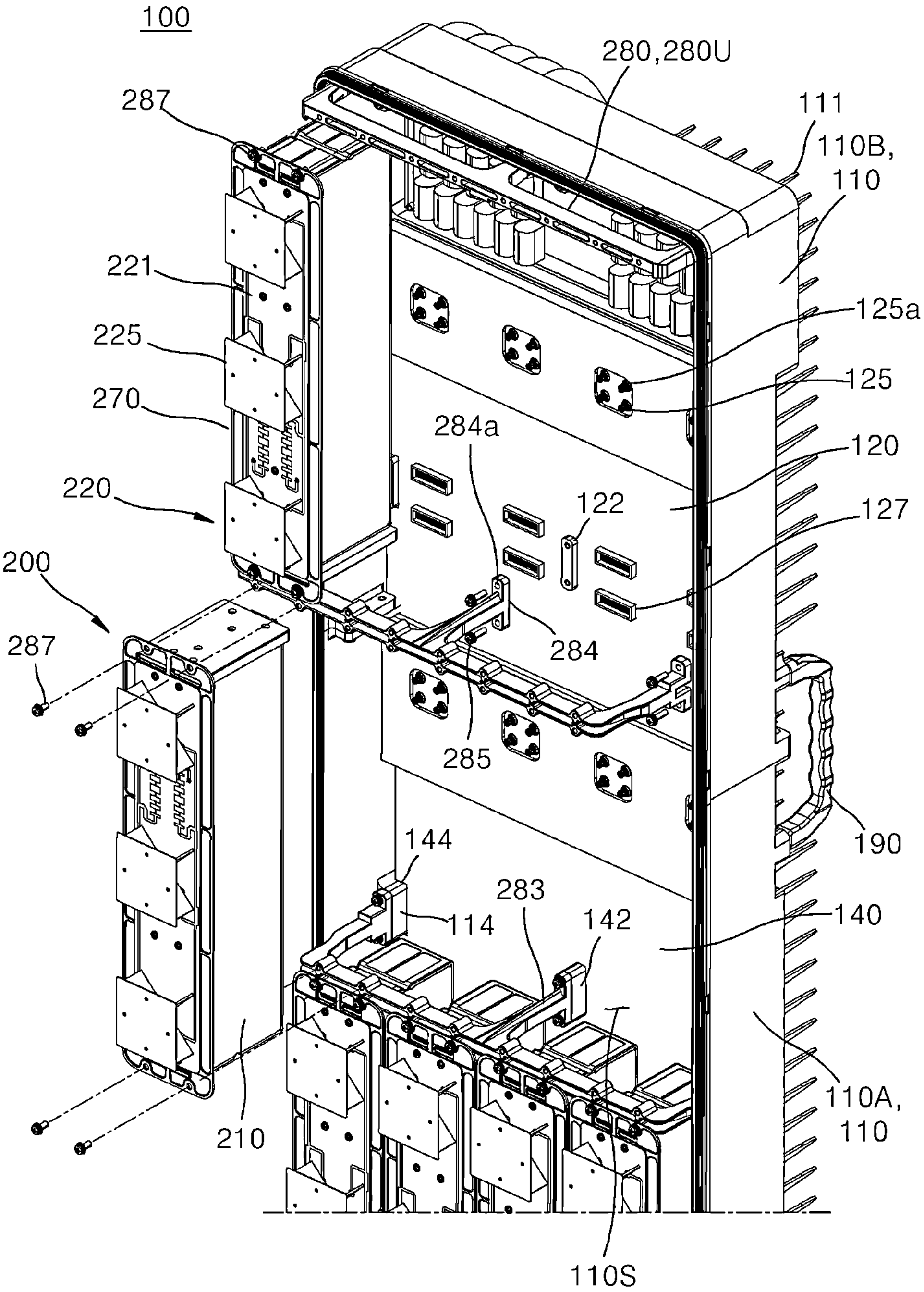

As illustrated in FIGS. 7 to 9, the plurality of fixing members 280 may each include, in common, a horizontal fixing bar 282 having a plurality of filter fixing screw holes 286, to which the unit RF filter bodies 210, among the components of the antenna RF module 200 to be described below, are fixed in a screw coupling manner, and a plurality of fixing legs 283 extending rearward from the horizontal fixing bar 282 and each having a rear end fixed to the front surface of the antenna housing part 110 or the board assembly (particularly, the main board 120 or the RFIC substrate part 140).

In this case, as illustrated in FIG. 9, a mounting bar 284 may be formed at a rear end of the fixing leg 283 and mediate screw coupling to the board assembly, and assembling holes 284*a* for screw-assembling using a plurality of fixing member assembling screws 285 may be formed in the mounting bar 284.

Meanwhile, the fixing legs 283 may be formed to extend rearward at three points from the horizontal fixing bar 282. More specifically, one side fixing leg and the other side fixing leg may extend rearward from two opposite ends of the horizontal fixing bar 282, and a center fixing leg may extend rearward from a center of the horizontal fixing bar 282.

In this case, one side fixing leg and the other side fixing leg extending rearward from the two opposite ends of the horizontal fixing bar 282 may be assembled to an edge mounting block 114, which is provided on an inner edge portion of the antenna housing part 110, by means of the fixing member assembling screw 285.

Further, the center fixing leg extending rearward from the center of the horizontal fixing bar 282 may be assembled, by means of the fixing member assembling screw 285, to a board mounting fixing block 122, which is formed on a front surface of the main board 120 of the board assembly, or a board mounting fixing block 142 formed on a front surface of the RFIC substrate part 140.

Block avoidance parts 144 for avoiding interference with the edge mounting block 114 may be formed at the left and right ends of the main board 120 and the RFIC substrate part 140 of the board assembly.

As described above, in the antenna apparatus 100 according to the embodiment of the present invention, the fixing leg 283 extending rearward is stably fixed to the inner surface of the antenna housing part 110 so that the plurality of fixing members 280 is substantially unaffected by the sidewall portion among the components of the antenna housing part 110, such that a sway (unintended movement) of the antenna RF module 200 may be more effectively prevented, which is advantageous in additionally solving the PIMD problem.

Meanwhile, the antenna apparatus 100 according to the embodiment of the present invention is not limited to the embodiment in which the fixing member 280 necessarily has the plurality of fixing legs 283.

Figure 10:
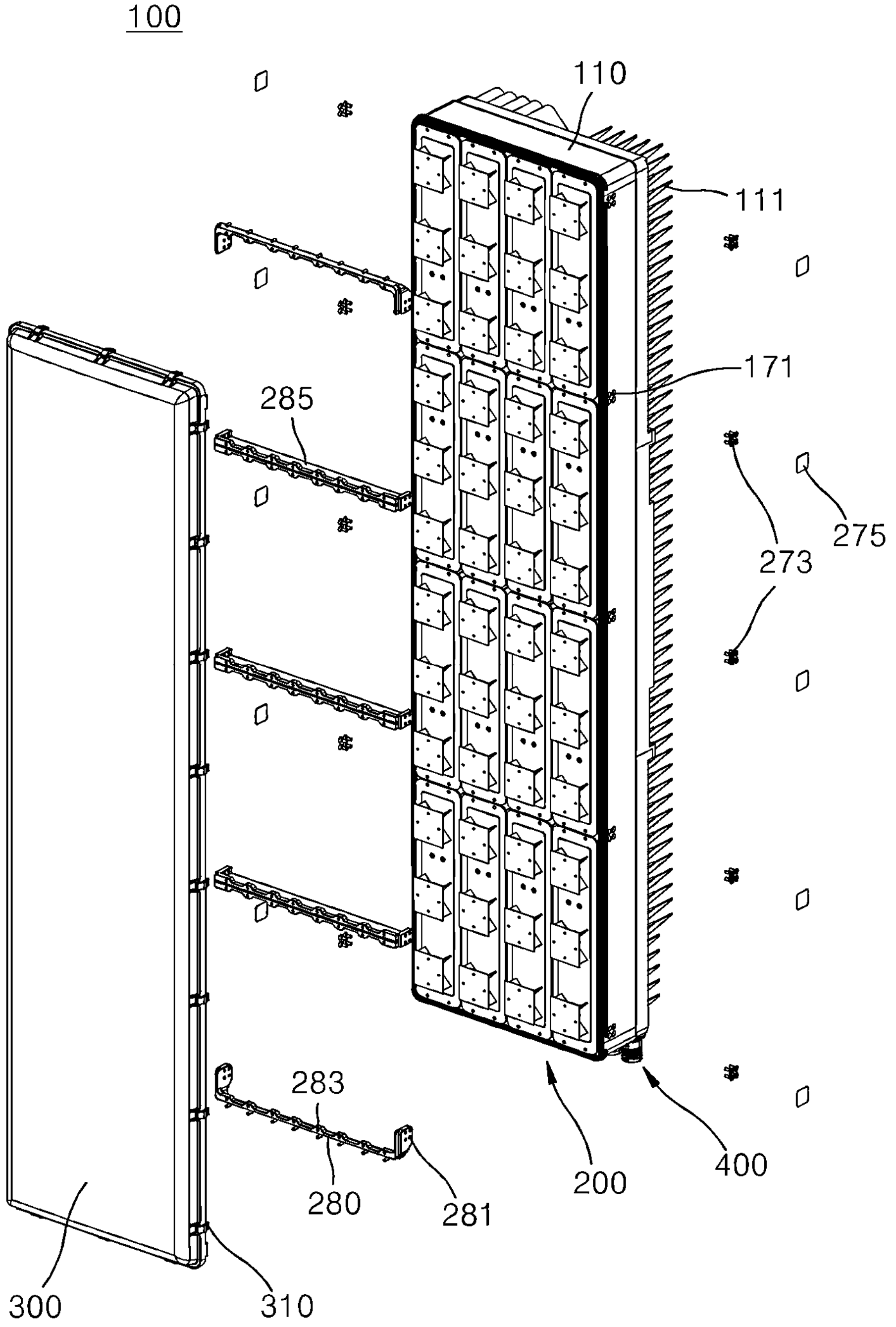
FIG. 10 is an exploded perspective view illustrating a modified embodiment of the fixing member among the components in FIGS. 3A and 3B.
Figure 11:
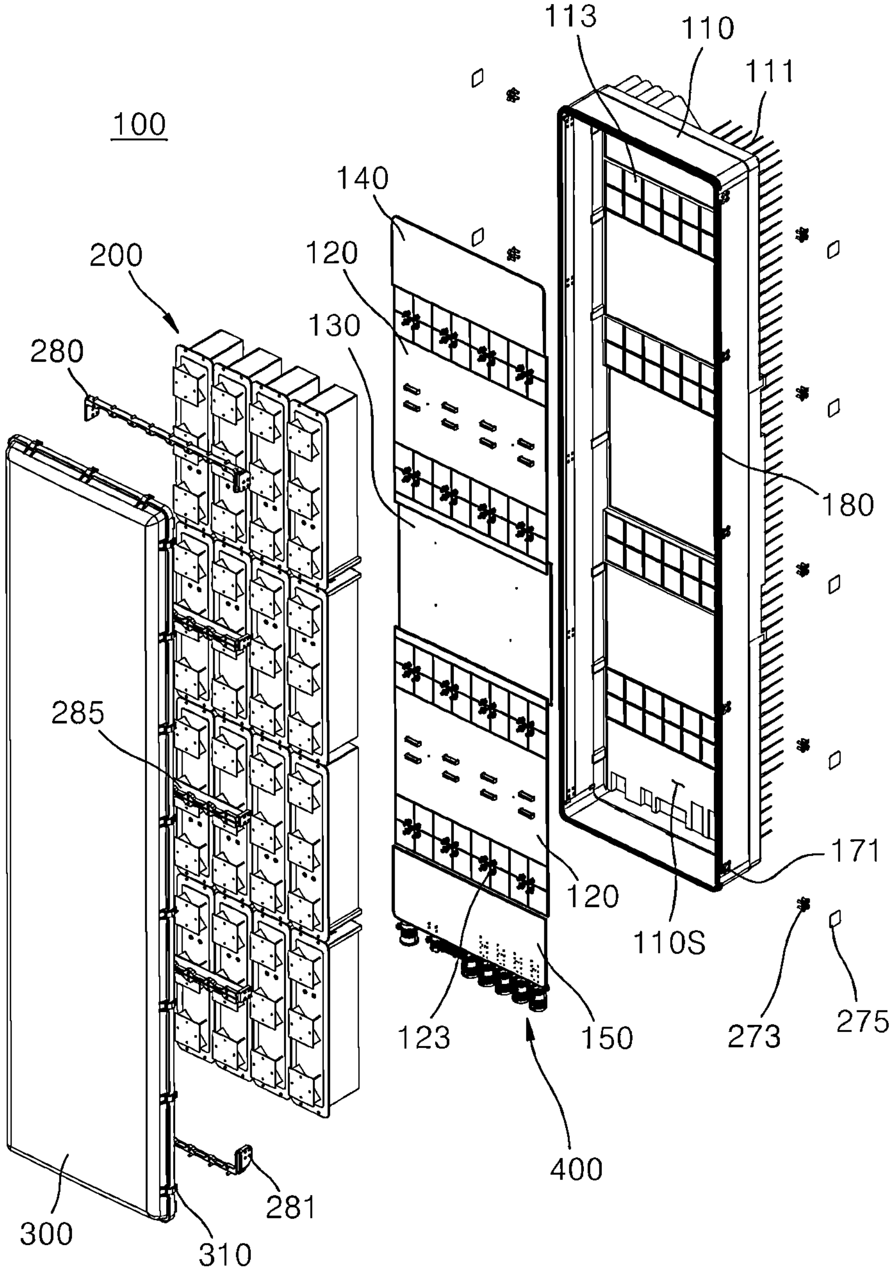
FIG. 11 is a detailed exploded perspective view of FIG. 10.
Figure 12A:
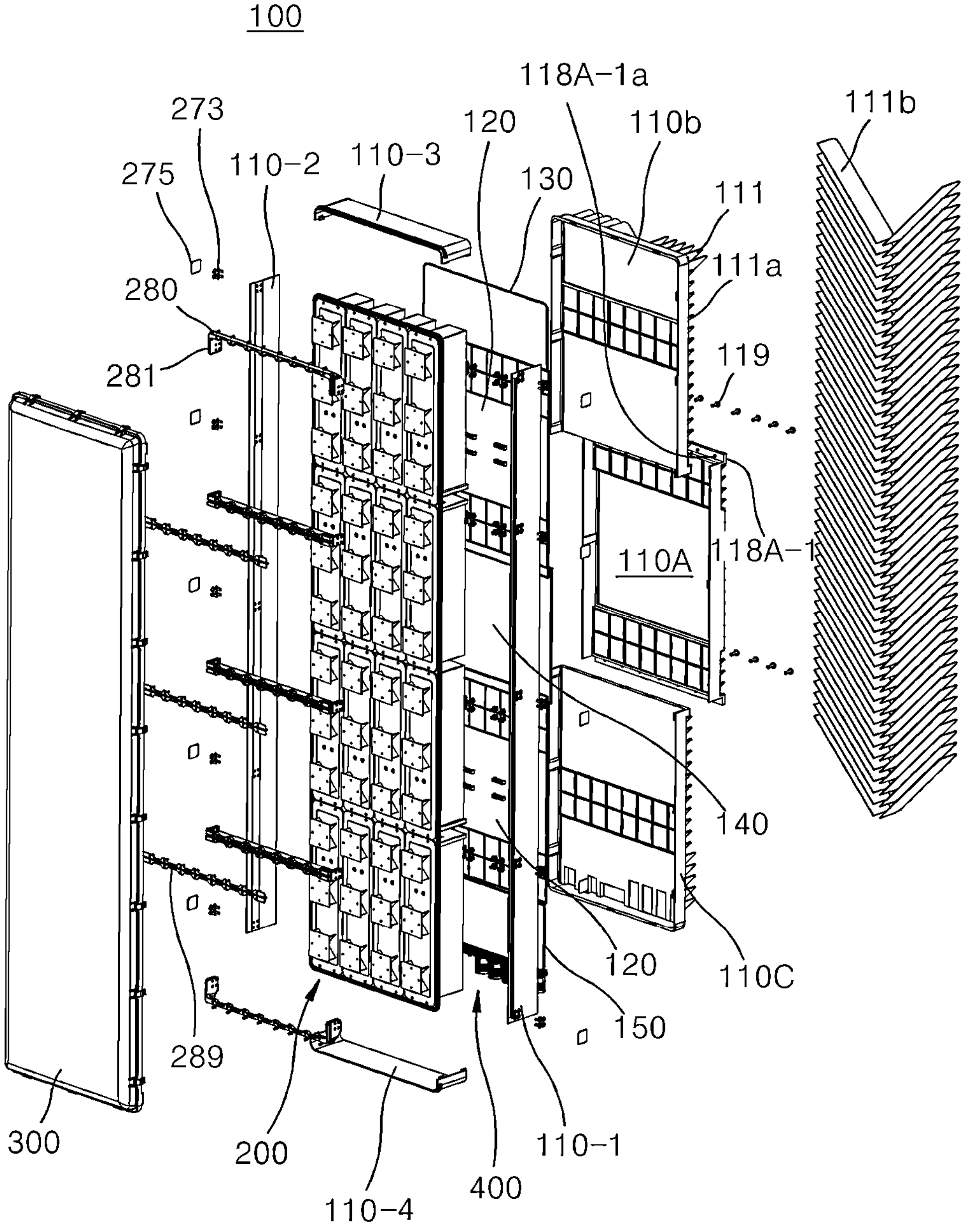
FIGS. 12A and 12B are exploded front and rear side perspective views illustrating a modified embodiment of the antenna housing part among the components in FIGS. 3A and 3B.
Figure 12B:
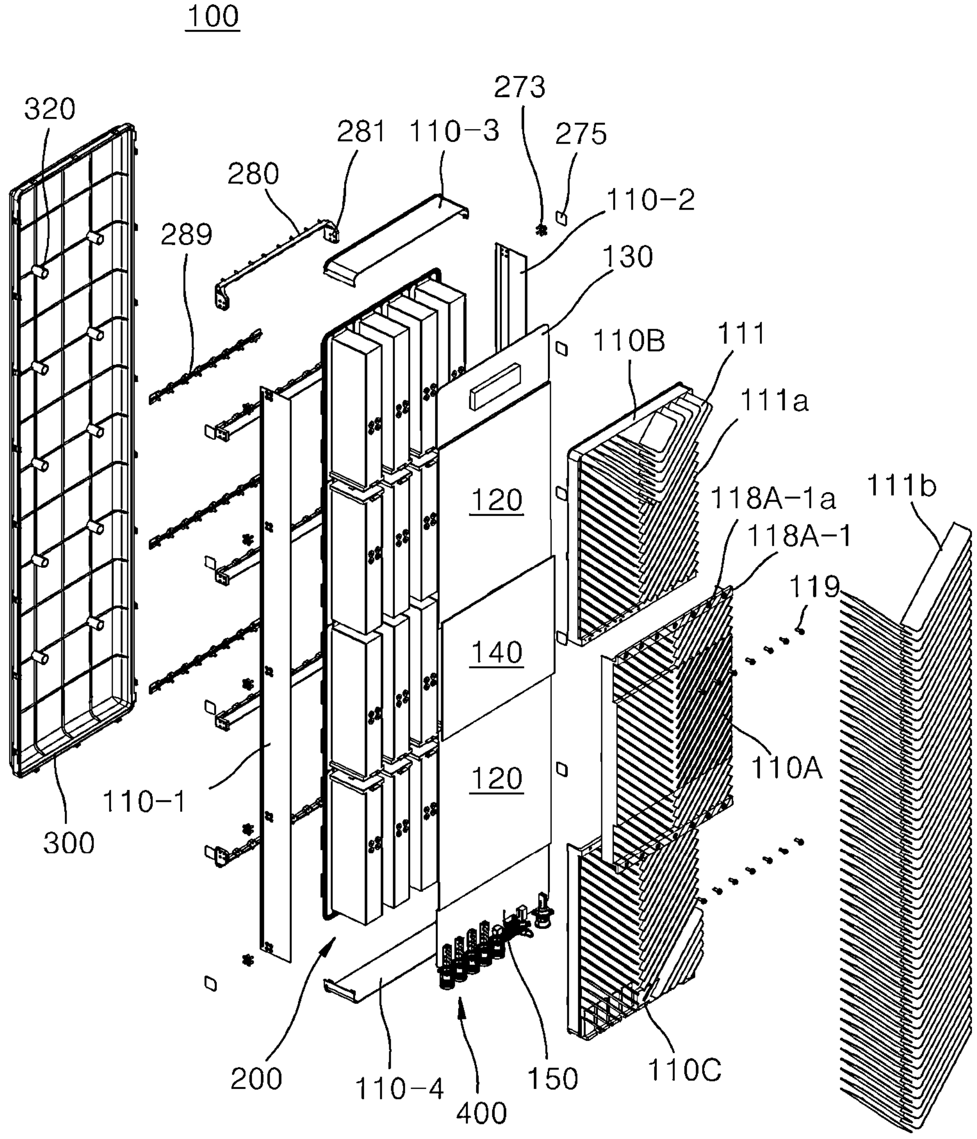

FIG. 10 is an exploded perspective view illustrating a modified embodiment of the fixing member among the components in FIGS. 3A and 3B, FIG. 11 is a detailed exploded perspective view of FIG. 10, and FIGS. 12A and 12B are exploded front and rear side perspective views illustrating a modified embodiment of the antenna housing part among the components in FIGS. 3A and 3B.

As illustrated in FIGS. 10 to 12B, in case that four side housing panels 110-1, 110-2, 110-3, and 110-4 having a single shape for each side portion are provided to define external appearances of upper and lower portions and left and right side portions regardless of the antenna housing part 110 divided into the three components, two opposite ends of the horizontal fixing bar 282 of the fixing member 280 may be directly fixed to a left housing panel 110-1 and a right housing panel 110-2, which constitute two opposite surfaces of four side housing panels 110-1, 110-2, 110-3, and 110-4, without providing the fixing leg 283 on the horizontal fixing bar 282.

More specifically, as illustrated in FIGS. 12A and 12B, the four side housing panels 110-1, 110-2, 110-3, and 110-4 may include the left housing panel 110-1 configured to define an external appearance of a left portion of the antenna apparatus 100, the right housing panel 110-2 configured to define an external appearance of a right portion of the antenna apparatus 100, an upper housing panel 110-3 configured to define an external appearance of an upper portion of the antenna apparatus 100, and a lower housing panel 110-4 configured to define an external appearance of a lower portion of the antenna apparatus 100.

In the related art, because the antenna housing part 110 needs to be made of a metallic material (material excellent in thermal conductivity) so that the heat generated from the heating elements in the internal space 110S of the antenna housing part 110 is efficiently radiated rearward, an overall weight of the antenna apparatus 100 is comparatively heavy in case that the antenna housing part 110 is elongated in the upward/downward direction. Therefore, the reason why the four side housing panels 110-1, 110-2, 110-3, and 110-4 are provided separately from the antenna housing part 110 is that the parts, which at least define the side portions (left and right side portions and upper and lower side portions) of the antenna housing part 110, as described above, are required to be substituted with the four side housing panels 110-1, 110-2, 110-3, and 110-4 made of a lightweight non-thermally conductive material, instead of a thermally conductive material in order to solve a problem of increase in weight.

The four side housing panels 110-1, 110-2, 110-3, and 110-4 may be made of the same material as the radome panel 300 to reduce the overall weight of the antenna apparatus 100 without being required to be made of the same material as the heat sink panels 110A, 110B, and 110C.

In this case, in case that the four side housing panels 110-1, 110-2, 110-3, and 110-4 are made of the same material as the radome panel 300, the strength thereof may be comparatively low. Therefore, the two opposite ends of the horizontal fixing bar 282, among the components of the fixing member 280, may be coupled to the inner surfaces of the left housing panel 110-1 and the right housing panel 110-2 to perform a reinforcement function and serve to securely fix the antenna RF module 200 to be described below.

In this case, the two opposite left and right ends of the fixing member 280 are positioned on inner portions of a plurality of left and right through-holes 171 formed through the left and right sidewalls of the antenna housing part 110 (i.e., the left housing panel 110-1 and the right housing panel 110-2), and then the plurality of assembling screws 273 is fastened to screw fastening holes 281 formed at the two opposite left and right ends while penetrating the plurality of left and right through-holes 171 from the outside, such that the fixing member 280 may be fixed. The plurality of screw fixing holes 281, to which the plurality of assembling screws 273 is fastened, may be formed at the two opposite left and right ends of the horizontal fixing bar 282 among the components of the fixing member 280.

The plurality of left and right through-holes 171 formed in the antenna housing part 110 and the plurality of assembling screws 273, which is fastened to the plurality of left and right through-holes 171, are exposed to the outside, which may cause a concern that an aesthetic appearance deteriorates. Therefore, as illustrated in FIGS. 12A and 12B, a separate shield film 275 may be used to shield the plurality of left and right through-holes 171. However, a member for shielding the plurality of left and right through-holes 171 is not necessarily limited to the film material. Any material may, of course, be provided as long as the material may shield the plurality of left and right through-holes 171.

In addition, a plurality of module fixing screw holes 283 is formed in a front surface of the horizontal fixing bar 282 of the fixing member 280 and spaced apart from each other in the leftward/rightward direction, and a plurality of assembling screws 287 is fastened to module fixing screw fastening holes 275 formed in a reflector panel 270 to be described below among the components of the RF module 200 assembled to the internal space 110S of the antenna housing part 110, such that the RF module 200 may be stably fixed. The specific configuration of and the coupling method for the RF module 200 will be described below more specifically.

In this case, the fixing member 280 may be made of a non-conductive material (e.g., a plastic resin-based material) to minimize an influence of passive intermodulation distortion (PIMD) and minimize an influence of a ground (GND) function of the reflector panel 270, and the plurality of assembling screws (not illustrated) may also be made of a plastic resin-based material.

In addition, although not illustrated in the drawings, the antenna apparatus 100 according to the embodiment of the present invention may further include a buffer part 289 made of a silicone rubber material and attached to the front end of the fixing member 280. The buffer part 289 may be seated and installed on the fixing member 280 configured to fix the unit RF filter body 210, such that the buffer part 289 may serve to mitigate an internal impact between the components.

As described above, the RF module 200 is modularized and manufactured. Meanwhile, as described below, because a coupling force between the main board 120 and the RF module 200 depends on a very low coupling force between the male socket part 235 of the LNA substrate part 231 and the first connecting pin terminal 281 of the unit RF filter body 210, it is difficult to maintain the PIMD properties. Therefore, the fixing member 280 configured to securely fix and support the RF module 200 may be used to solve the PIMD problem. This configuration will be described again with reference to the detailed description of the components of the RF module 200.

Meanwhile, as illustrated in FIGS. 2 to 12B, the antenna apparatus 100 according to the embodiment of the present invention may further include the radome panel 300 coupled to the front end of the antenna housing part 110 (or the front ends of the four side housing panels 110-1, 110-2, 110-3, and 110-4) and configured to protect the RF module 200 that is provided in the internal space 110S and will be described below.

As described above, the radome panel 300 may serve to protect the plurality of constituent components provided in the internal space 110S of the antenna housing part 110 from the outside and support the front sides of the plurality of fixing members 280 when the radome panel 300 is coupled to the antenna housing part 110.

In this case, the plurality of fixing members 280 may be supported by the radome panel 300 in the state in which the buffer part 289 made of a silicone rubber material is interposed between the plurality of fixing members 280 and the rear surface of the radome panel 300.

In addition, a plurality of support bosses 320 extending rearward may be further provided on the rear portion of the radome panel 300 to at least support a part of the front surface of the buffer part 289.

Meanwhile, as illustrated in FIGS. 12A and 12B, in the antenna apparatus 100 according to the embodiment of the present invention, the plurality of rear heat radiating fins 111 may be provided on the rear surface of the antenna housing part 110 (i.e., the center heat sink panel 110A, the upper heat sink panel 110B, and the lower heat sink panel 110C) to increase a heat radiation surface area of the heat generated from the heating elements in the internal space 110S.

In this case, at least some 111*b* of the plurality of rear heat radiating fins 111 may be separately manufactured and coupled to coupling heat sink ribs 111*a* integrally formed on the rear portions of the heat sink panels 110A, 110B, and 110C.

As described above, in order to improve the process convenience, some 111*a* of the plurality of rear heat radiating fins 111 are integrally in rib shapes on the heat sink panels 110A, 110B, and 110C, and some 111*b* of the remaining rear heat radiating fins 111 are manufactured separately and coupled to the coupling heat sink ribs 111*a*. The rear heat radiating fins 111*b*, which are manufactured separately and coupled to the coupling heat sink ribs 111*a*, may be coupled by using welding or thermal epoxy so as to have minimum thermal resistance.

In this case, the rear heat radiating fins 111*b*, which are manufactured separately and coupled among the plurality of rear heat radiating fins 111, may be configured as active fins having a wick structure in which a refrigerant is injected into the wick structure and transfers heat while being changed in phase by the heat transferred from the coupling heat sink ribs 111*a*.

The rear heat radiating fin 111, which is provided as an active fin having a wick structure, may significantly improve the heat radiation performance by means of heat transfer made by a thermally conductive material of the rear heat radiating fin 111 and active heat transfer made by the refrigerant.

In this case, as illustrated in FIGS. 12A and 12B, the rear heat radiating fins 111*b*, which are provided as active fins, are disposed to be inclined from left and right centers of the rear surface of the antenna housing part 110 in the leftward direction and the rightward direction, such that the heating elements may be mounted and disposed at positions corresponding to lower ends of the rear heat radiating fins 111*b*, and the heat, which is transferred from the heating elements through the lower ends of the rear heat radiating fins 111*b*, may change the phase of the refrigerant from the liquid refrigerant to the gaseous refrigerant and move upward by a capillary force, and then the heat may be radiated to the outside from upper ends of the rear heat radiating fins 111*b*.

Figure 13:
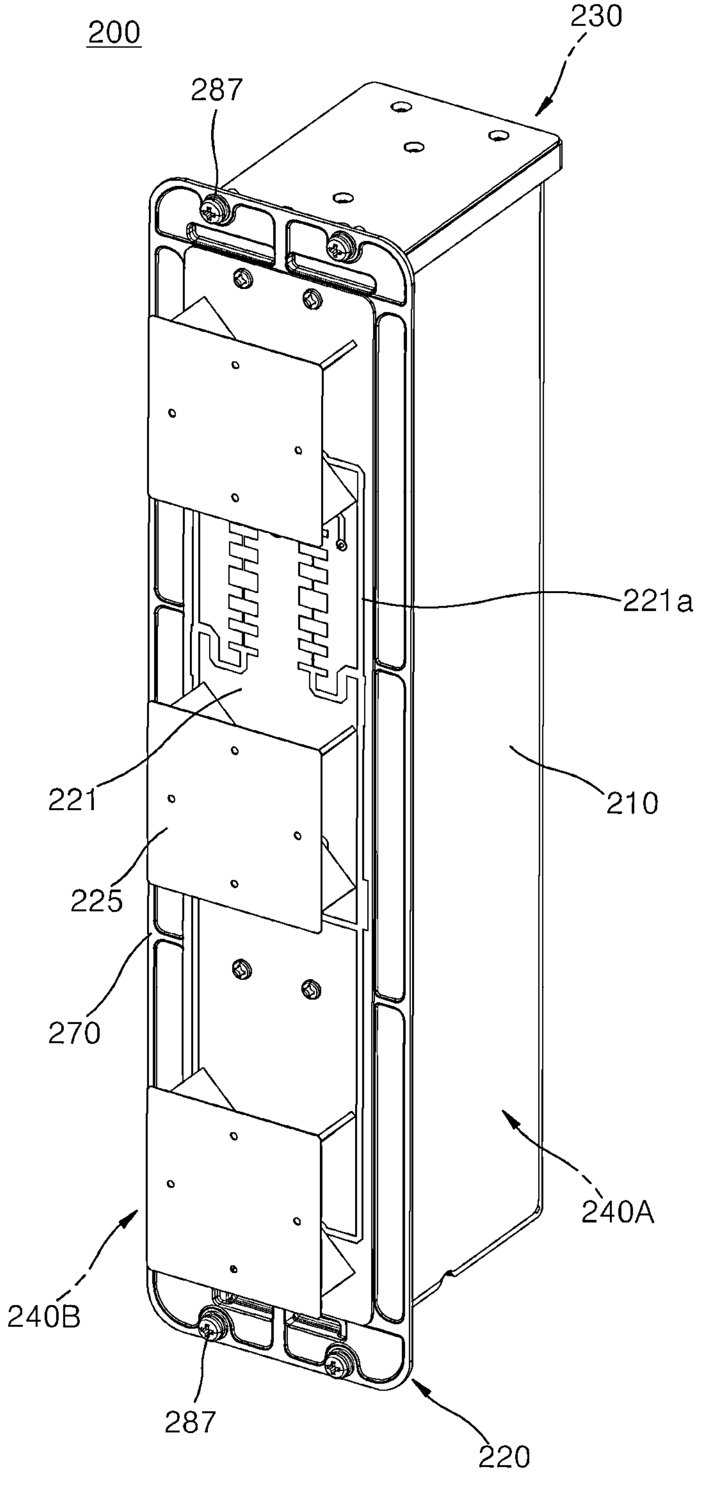
FIG. 13 is a perspective view illustrating the antenna RF module among the components in FIGS. 3A and 3B.

FIG. 13 is a perspective view illustrating the antenna RF module among the components in FIGS. 3A and 3B, and FIGS. 14A to 14D are exploded perspective views of FIG. 10 in the leftward direction and the rightward direction.

Figure 14A:
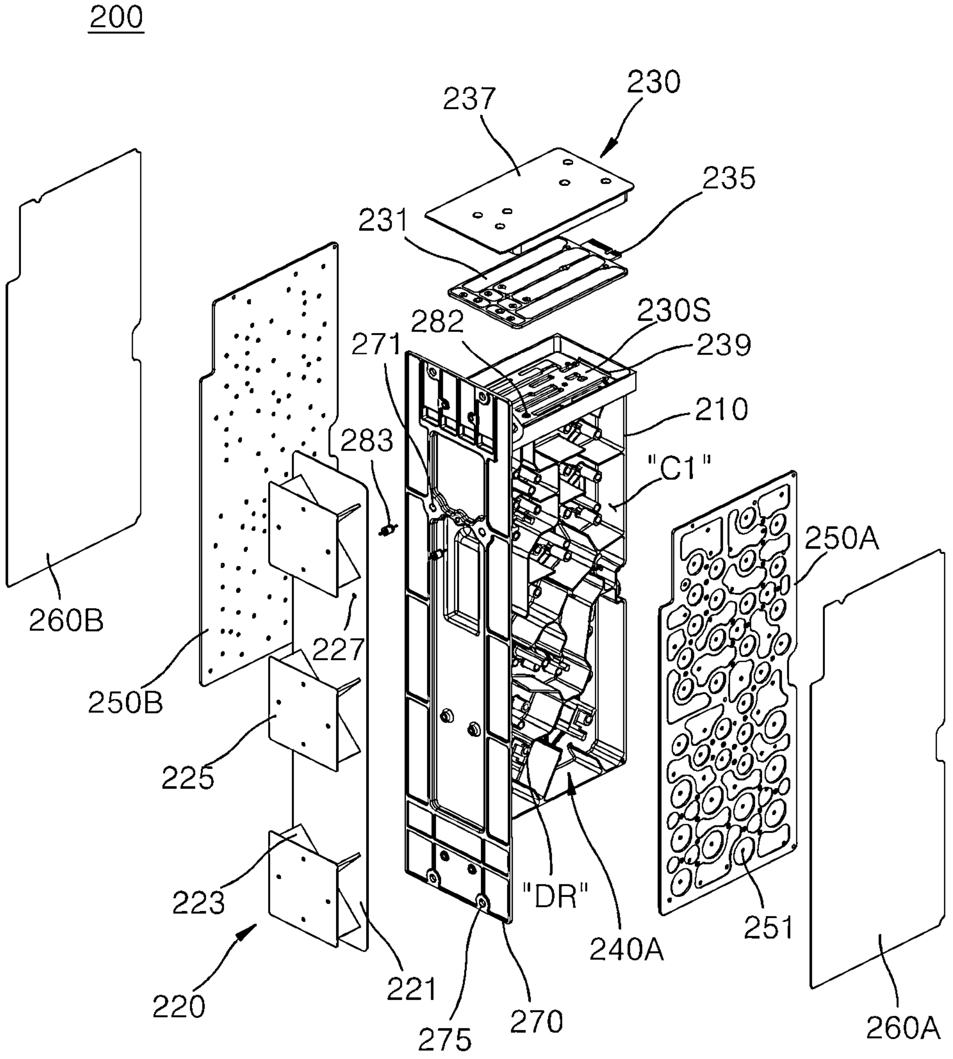
FIGS. 14A to 14D are exploded perspective views of FIG. 10 in a leftward direction and a rightward direction.
Figure 14B:
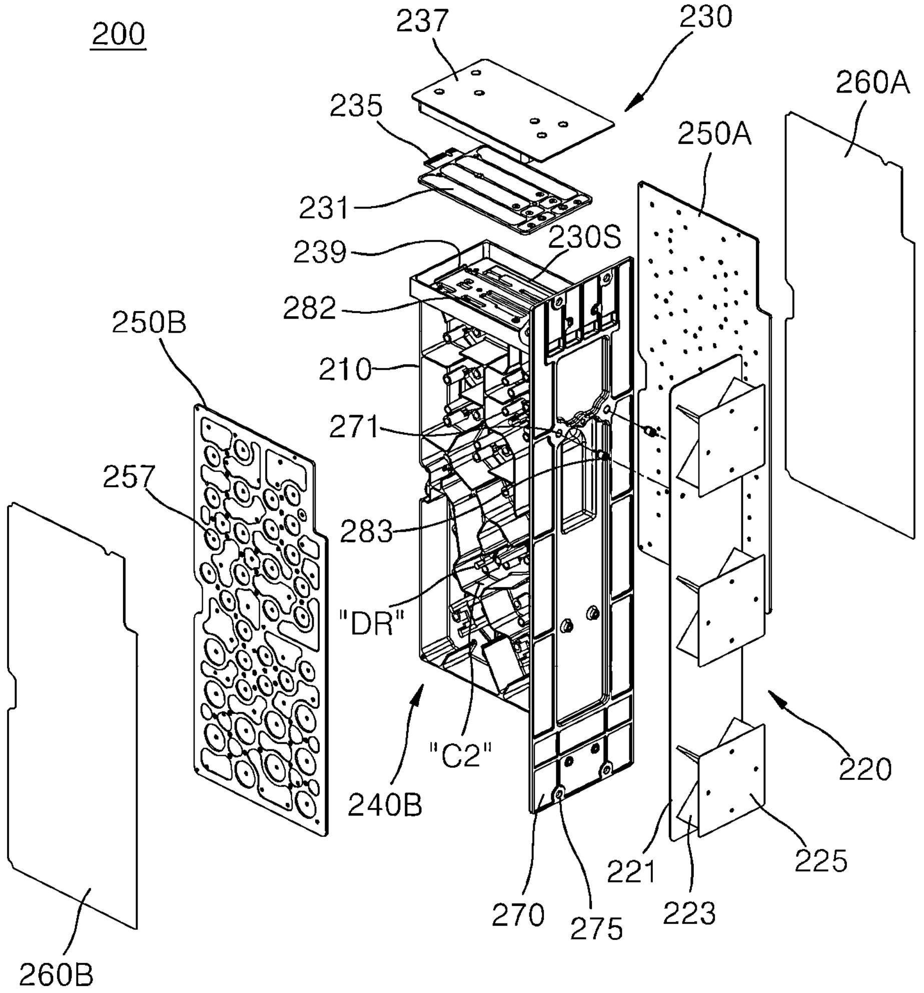
Figure 14C:
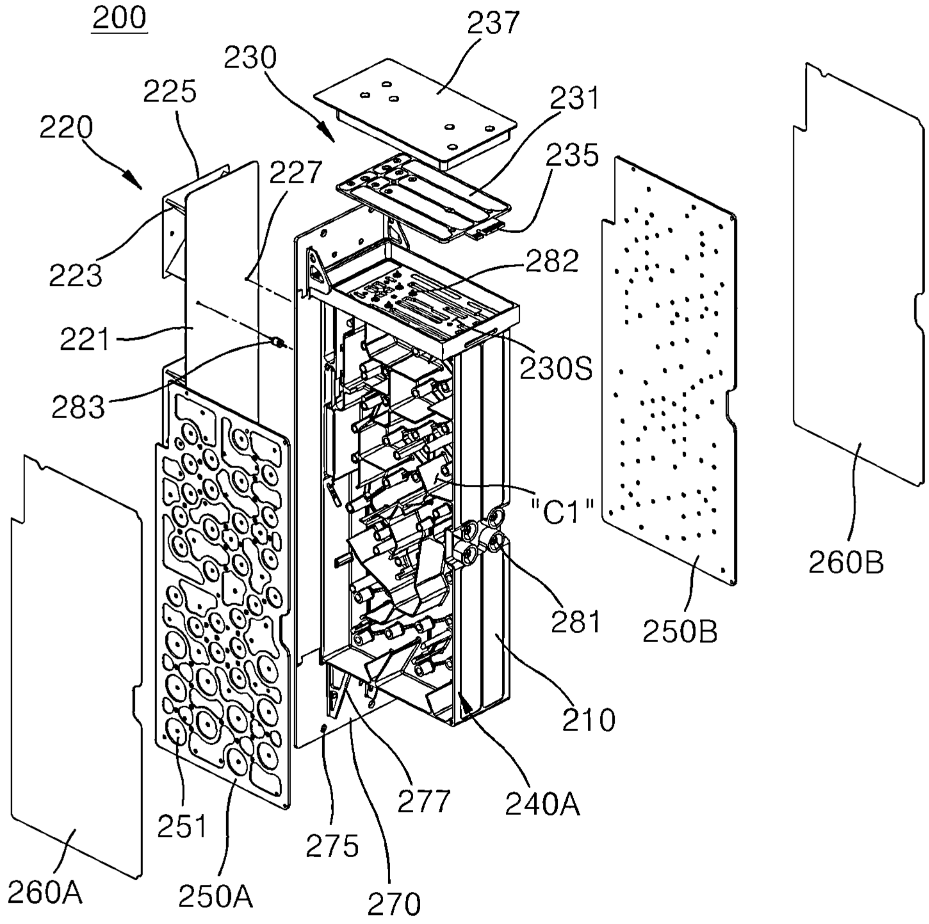
Figure 14D:
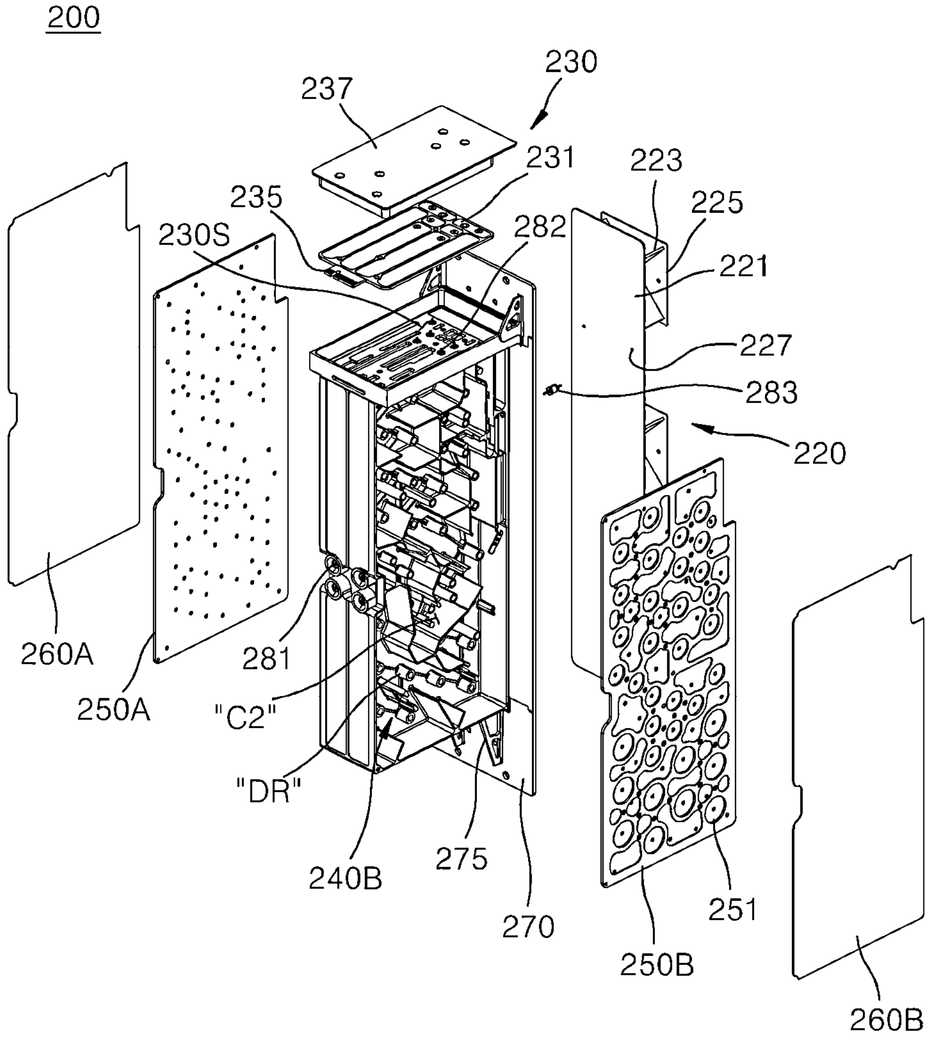

With reference to FIGS. 13 to 14D, one embodiment of the antenna RF module 200 according to the present invention may include the unit RF filter body 210 arranged on the front surface of the main board 120, a radiating element part 220 disposed on a front surface of the unit RF filter body 210, the amplification element part 230 provided on any one of upper and lower surfaces, i.e., front and rear thickness portions of the unit RF filter body 210 and including the LNA substrate part 231 on which at least one analog amplification element (not illustrated) is mounted, and the reflector panel 270 formed on a front end surface of the unit RF filter body 210, formed to extend more widely than a front surface area of the unit RF filter body 210, and configured to ground (GND) the radiating element part 220.

In this case, a plurality of cavities C1 and C2, which is opened outward in the leftward/rightward direction, is formed at left and right sides of the unit RF filter body 210, and the left and right filter parts 240A and 240B having resonators DR respectively embedded in the cavities C1 and C2 may be provided to filter different frequencies. Hereinafter, the left filter part 240A and the right filter part 240B will be described on the assumption that the left filter part 240A and the right filter part 240B are positioned at the left and right sides based on the forward direction.

The left filter part 240A and the right filter part 240B may be respectively designed as a filter for a frequency band of 2.4G and a filter for a frequency band of 5G and implement a dual band antenna using the single RF module 200.

Meanwhile, the radiating element part 220 may be provided to generate at least one polarization of the dual polarization.

More specifically, as illustrated in FIGS. 13 to 14D, the radiating element part 220 may include a base panel 221 disposed on a front surface of the reflector panel 270, power supply feeding bases 223 attached to the base panel 221, electrically connected to the left filter part 240A and the right filter part 240B, and arranged to intersect in an 'X' shape, and radiation director panels 225 provided at front ends of the power supply feeding bases 223. A transmission line 221*s* having a predetermined pattern may be patterned and printed on the front surface of the base panel 221 and connected to an input terminal of the power supply feeding base 223.

The radiation director panel 225 may be formed in an approximately square shape. The power supply feeding base 223 may be positioned to diagonally support edge portions of the radiation director panel 225, and feeding ends of the power supply feeding bases 223 extend to be positioned at centers of sides of the radiation director panel 225 and feeding-connected, such that the power supply feeding bases 223 may implement the polarization, thereby implementing the dual polarization.

The base panel 221 may be electrically connected to the left filter part 240A and the right filter part 240B formed at the left and right sides of the unit RF filter body 210 to mediate the transmission of transmission signals from the left filter part 240A and the right filter part 240B and the transmission of reception signals from the radiation director panel 225. The electrical connection mechanism between the base panel 221 and the filter parts 240A and 240B will be described below more specifically.

In the antenna RF module 200 according to the embodiment of the present invention, the radiating element part 220 is described as being limited to any one of the patch type and the dipole type but is not necessarily limited thereto. It should be noted that the application of an air-strip-type antenna is not excluded.

Meanwhile, as illustrated in FIGS. 13 to 14D, the amplification element part 230 may include the LNA substrate part 231 in a substrate installation space 230S provided in any one of upper and lower surfaces that define front and rear thickness portions of the unit RF filter body 210.

At least one LNA element (not illustrated), which generates a comparatively small amount of heat, among the analog amplification elements, and serves to amplify the reception signal, may be mounted on the LNA substrate part 231.

In general, the RF module refers to an assembly of analog RF components. For example, the amplification element part 230 is mounted with analog amplification elements configured to amplify RF signals. The RF module 200 according to the embodiment of the present invention is designed such that only the LNA elements, which generate a comparatively small amount of heat among the analog amplification elements, are separated from the main board 120 and included in the unit RF filter body 210. In addition, the left filter part 240A and the right filter part 240B may be defined as RF components for filtering a frequency of the inputted RF signal to a desired frequency band, and the radiating element part 220 may be defined as an RF component that serves to receive and transmit the RF signal.

In this case, the LNA substrate part 231 may be electrically connected to the cavities C1 and C2 of the left filter part 240A and the right filter part 240B formed at the left and right sides of the unit RF filter body 210. The electrical connection mechanism between the LNA substrate part 231 and the filter parts 240A and 240B will be described below more specifically.

The substrate installation space 230S, in which the LNA substrate part 231 is installed, may be shielded by using an amplification part cover panel 237, and amplification part heat sink fins (not illustrated) may be integrally formed on an outer surface of the amplification part cover panel 237 and radiate heat in the substrate installation space 230S in a thermal conduction manner. The heat discharged through the amplification part heat sink fins may be radiated to the outside through a side surface portion of the antenna housing part 110.

Meanwhile, as illustrated in FIGS. 13 to 14D, the reflector panel 270 may be formed on the front surface of the unit RF filter body 210.

The reflector panel 270 may serve to prevent the rearward penetration of radio waves (beams) radiated from the radiating element part 220 coupled to the front end of the unit RF filter body 210 and ground (GND) the radiating element part 220.

Further, module fixing screw fastening holes 275 may be formed at the upper and lower ends of the reflector panel 270, and the plurality of assembling screws 287, which has been described with reference to FIGS. 2 to 9 and implements screw fixing by the fixing members 280, may be fastened to the module fixing screw fastening holes 275.

As described already, the fixing members 280 serve to compensate for a low coupling force of the unit RF filter body 210 to the main board 120 and stably fix the unit RF filter body 210 at the rear or front side of the reflector panel 270 during a process in which the fixing members 280 are assembled to the antenna housing part 110, thereby solving the PIMD problem caused by an unintended movement or clearance of the unit RF filter body 210.

Figure 15A:
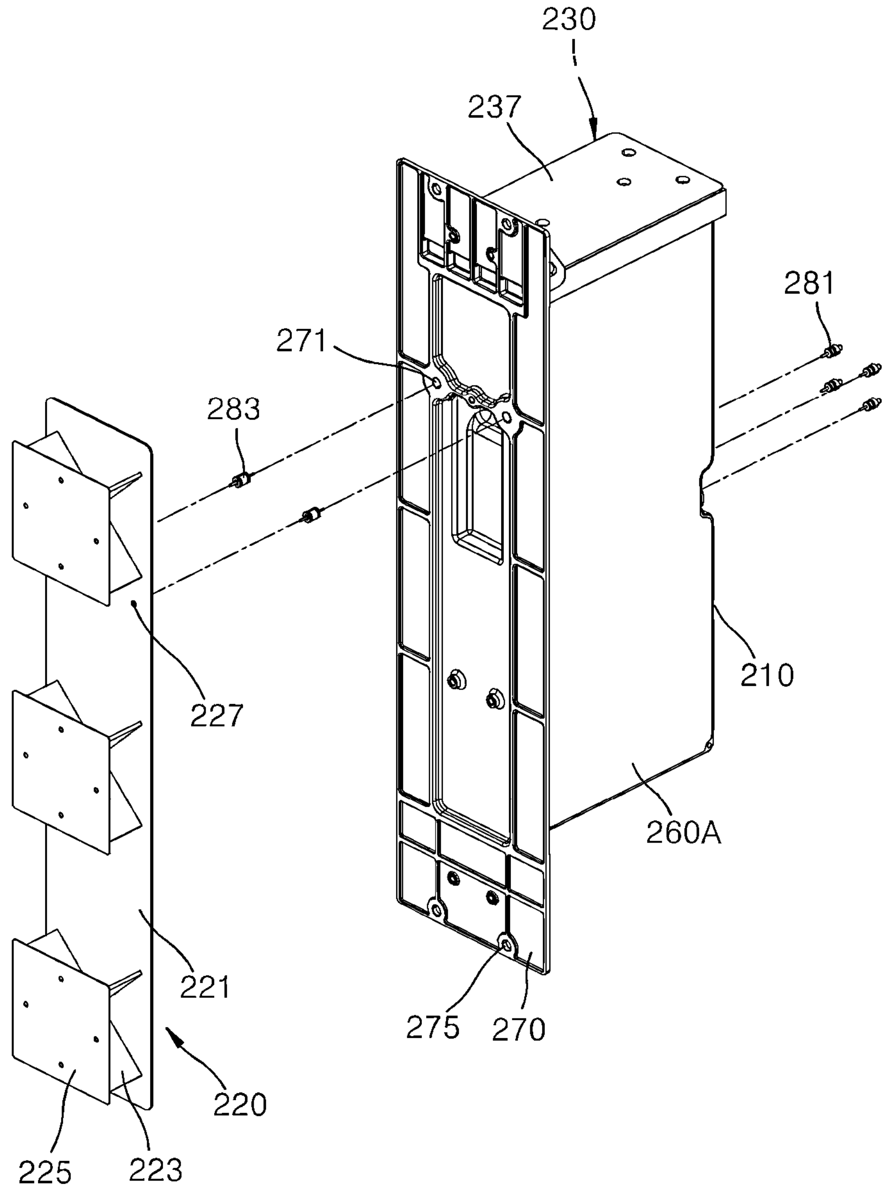
FIGS. 15A and 15B are exploded perspective views for explaining a coupling relationship between a radiating element part and a unit RF filter body among the components of the antenna RF module.
Figure 15B:
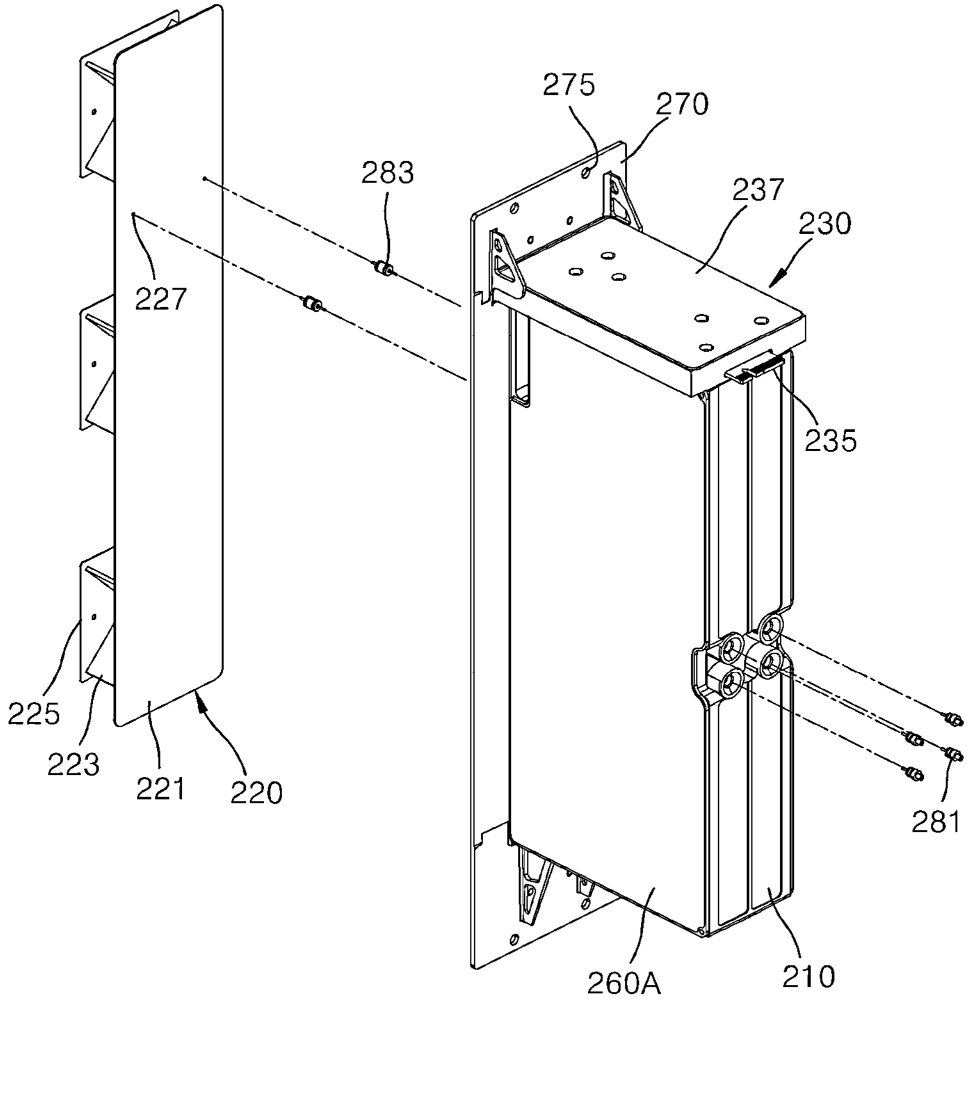
Figure 16:
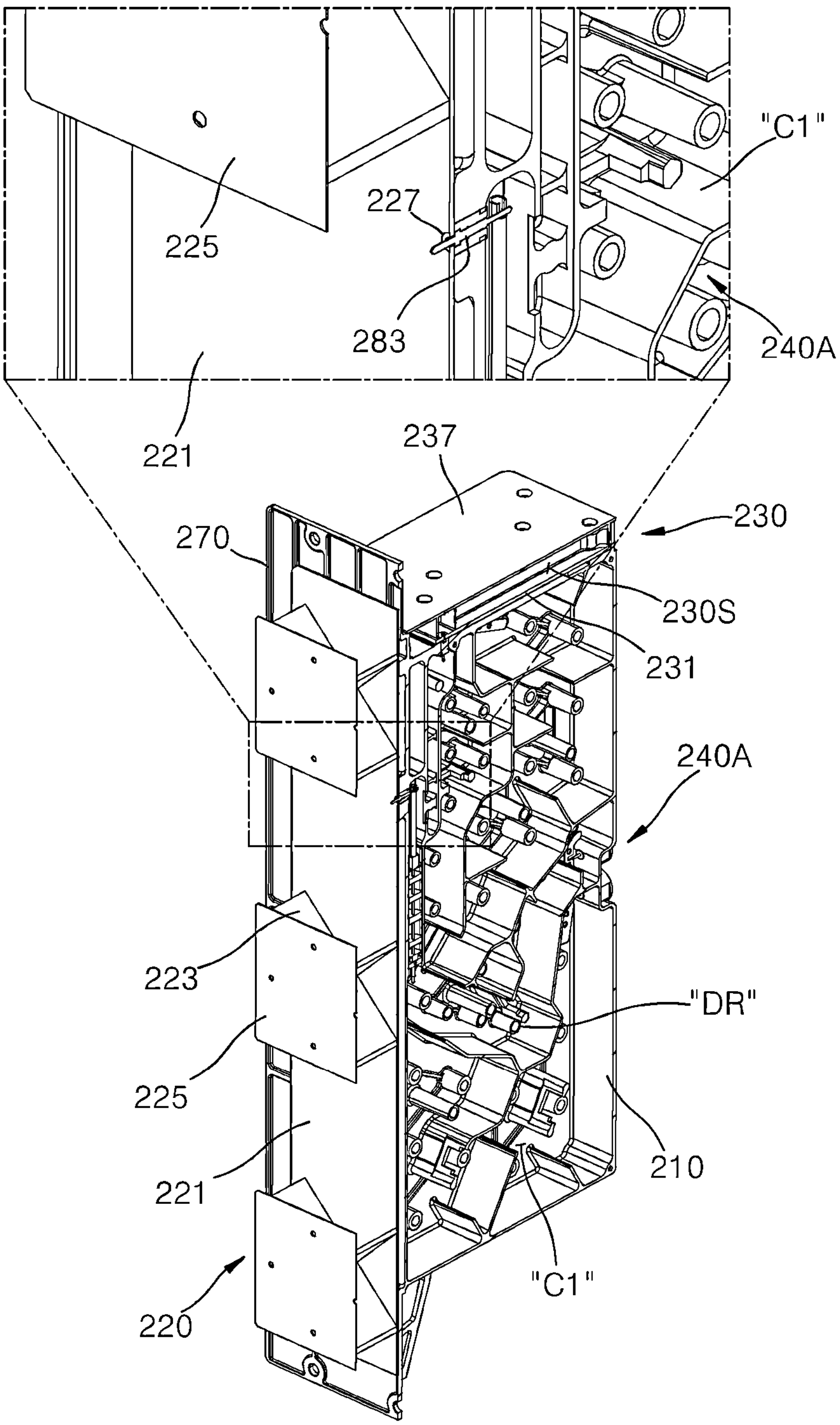
FIG. 16 is a cut-away perspective view and a partially enlarged view illustrating a state of mutual electrical connection made by a third connecting pin terminal illustrated in FIGS. 15A and 15B.

FIGS. 15A and 15B are exploded perspective views for explaining a coupling relationship between the radiating element part and the unit RF filter body among the components of the antenna RF module, and FIG. 16 is a cut-away perspective view and a partially enlarged view illustrating a state of mutual electrical connection made by the third connecting pin terminal illustrated in FIGS. 15A and 15B.

As illustrated in FIGS. 15A and 15B, the left filter part 240A and the right filter part 240B, which are respectively formed at the left and right sides of the unit RF filter body 210, may be electrically connected by means of the first connecting pin terminals 281 provided on the pin coupling part 125 provided on the front surface of the main board 120.

More specifically, at least one input/output port (no reference numeral) may be provided at a rear side of the unit RF filter body 210 and serve to transmit transmission signals through the left filter part 240A and the right filter part 240B.

In this case, at least one input/output port allows the main board 120, the left filter part 240A, and the right filter part 240B to be electrically connected by means of the first connecting pin terminals 281 among the components of the filter connecting part.

Meanwhile, with reference to FIGS. 15A, 15B, and 16, the base panels 221 of the radiating element part 220 may be electrically connected by means of the third connecting pin terminal 283, which is one of the components of the filter connecting part in order to mediate the transmission of the transmission signals from the left filter part 240A and the right filter part 240B and the transmission of the reception signal from the radiation director panel 225. The third connecting pin terminal 283 may be coupled to the base panel 221 in a terminal pin coupling manner and then fixed by solder in a coupling manner such as soldering.

Figure 17:
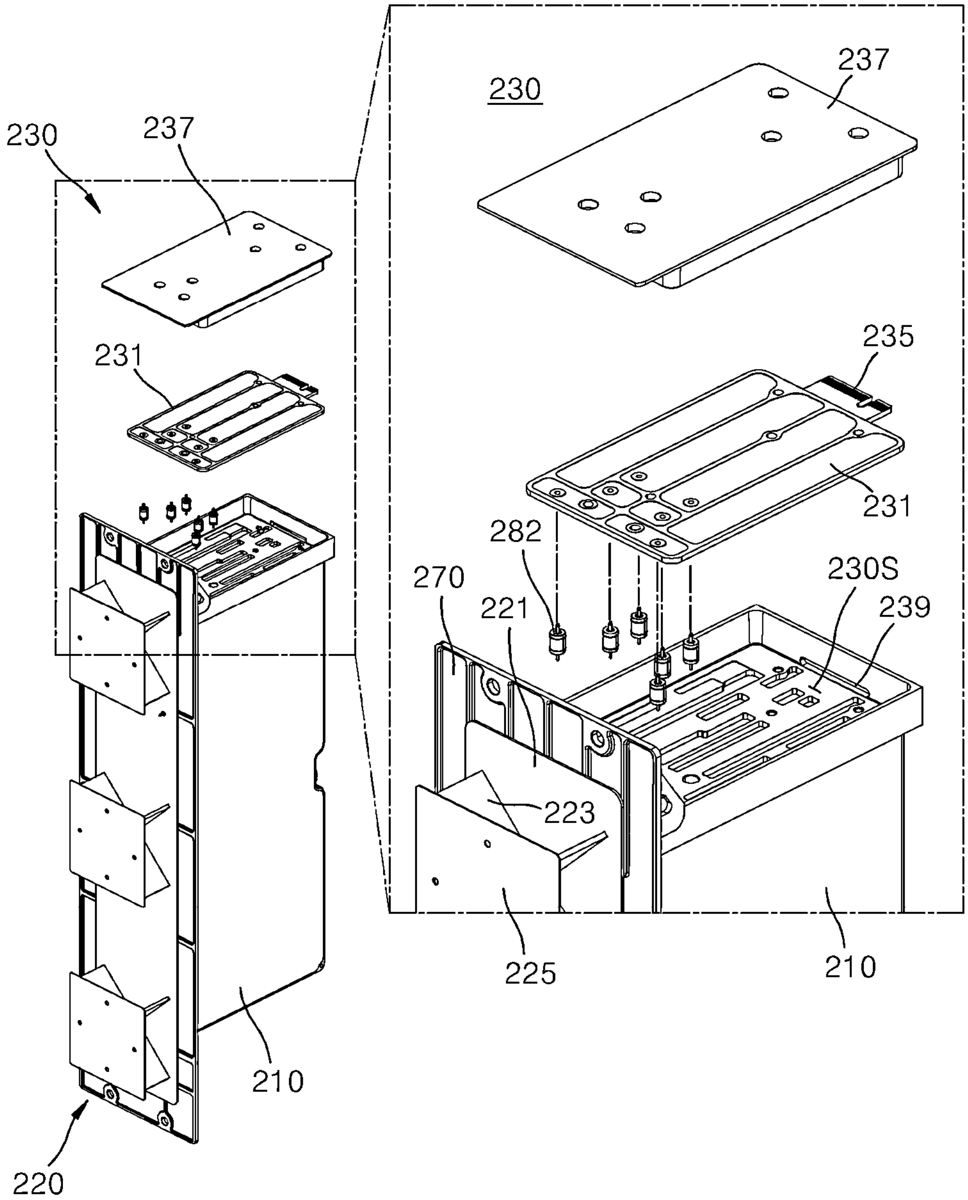
FIG. 17 is an exploded perspective view for explaining a coupling relationship between the amplification element part and the unit RF filter body among the components of the antenna RF module.
Figure 18:
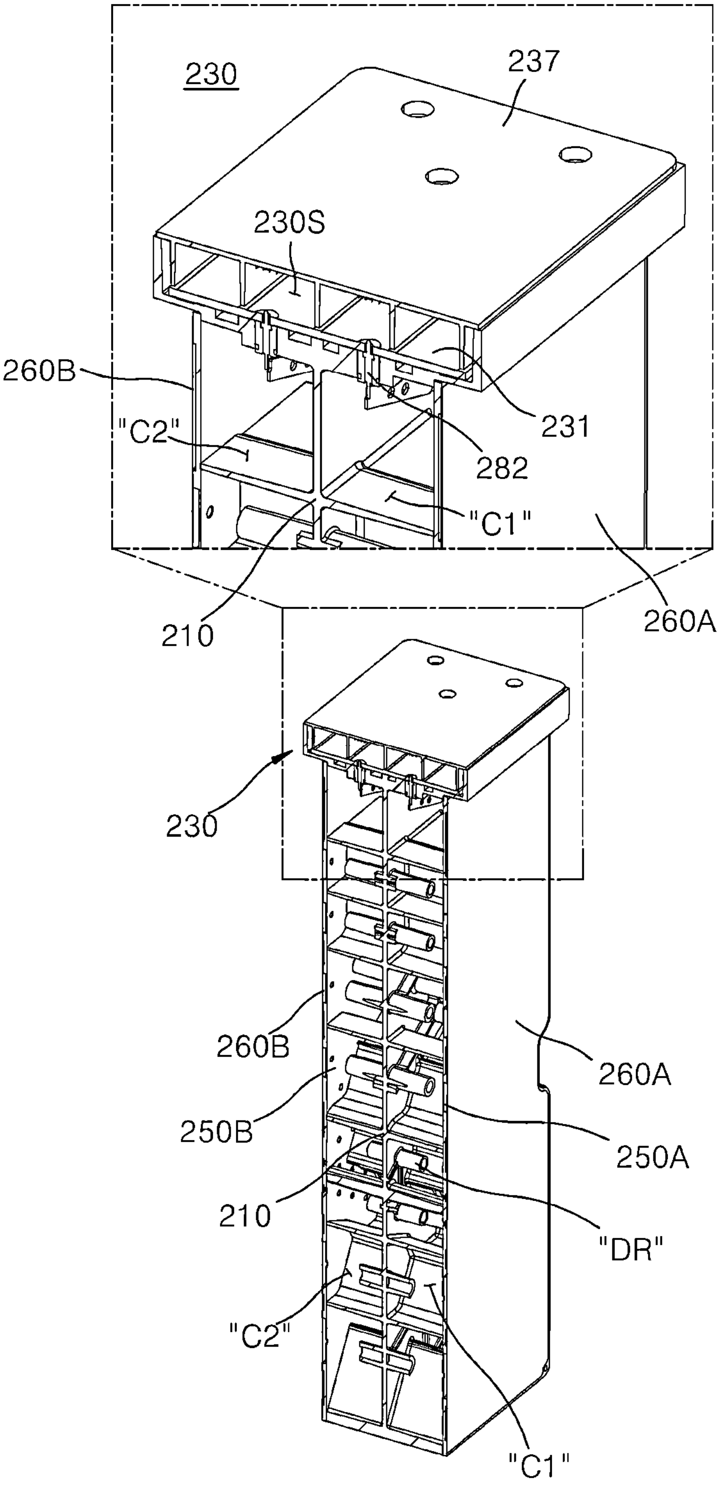
FIG. 18 is a cut-away perspective view and a partially enlarged view illustrating a state of mutual electrical connection made by a second connecting pin terminal illustrated in FIG. 17.
Figure 19A:
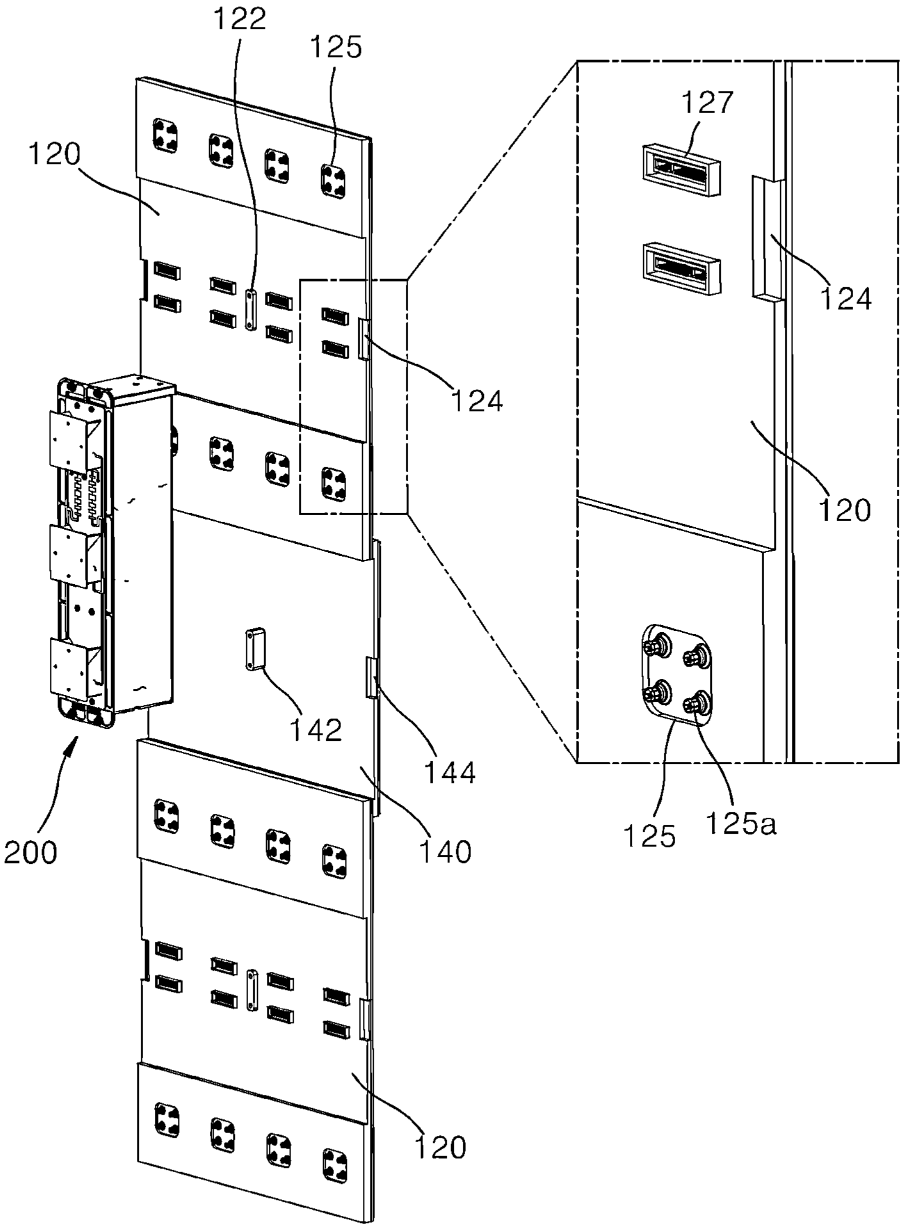
FIGS. 19A and 19B are exploded front and rear side perspective views and partially enlarged views for explaining a state of mutual electrical connection of the board assembly made by a first connecting pin terminal and an LNA substrate part illustrated in FIGS. 15A and 15B.
Figure 19B:
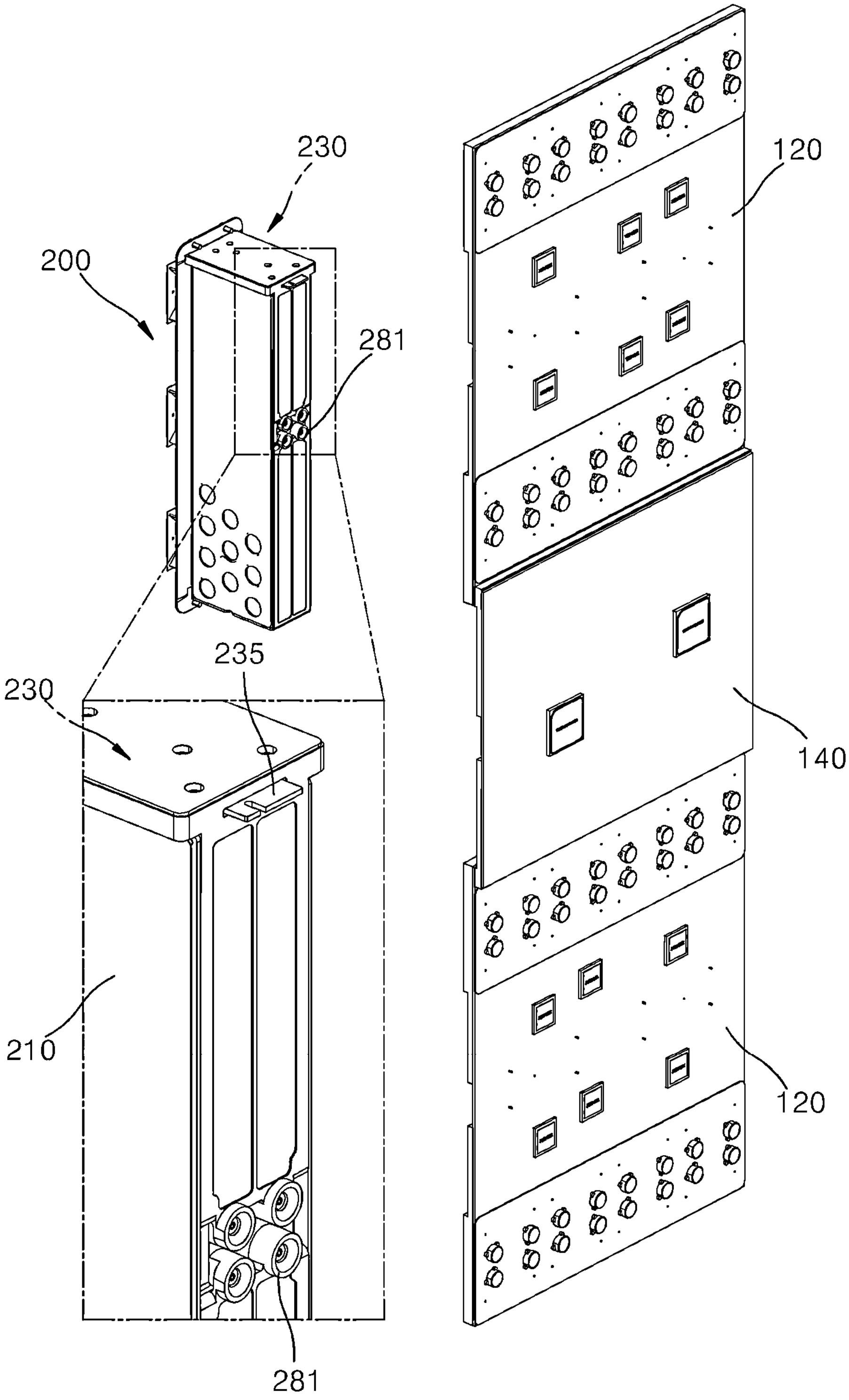
Figure 20:
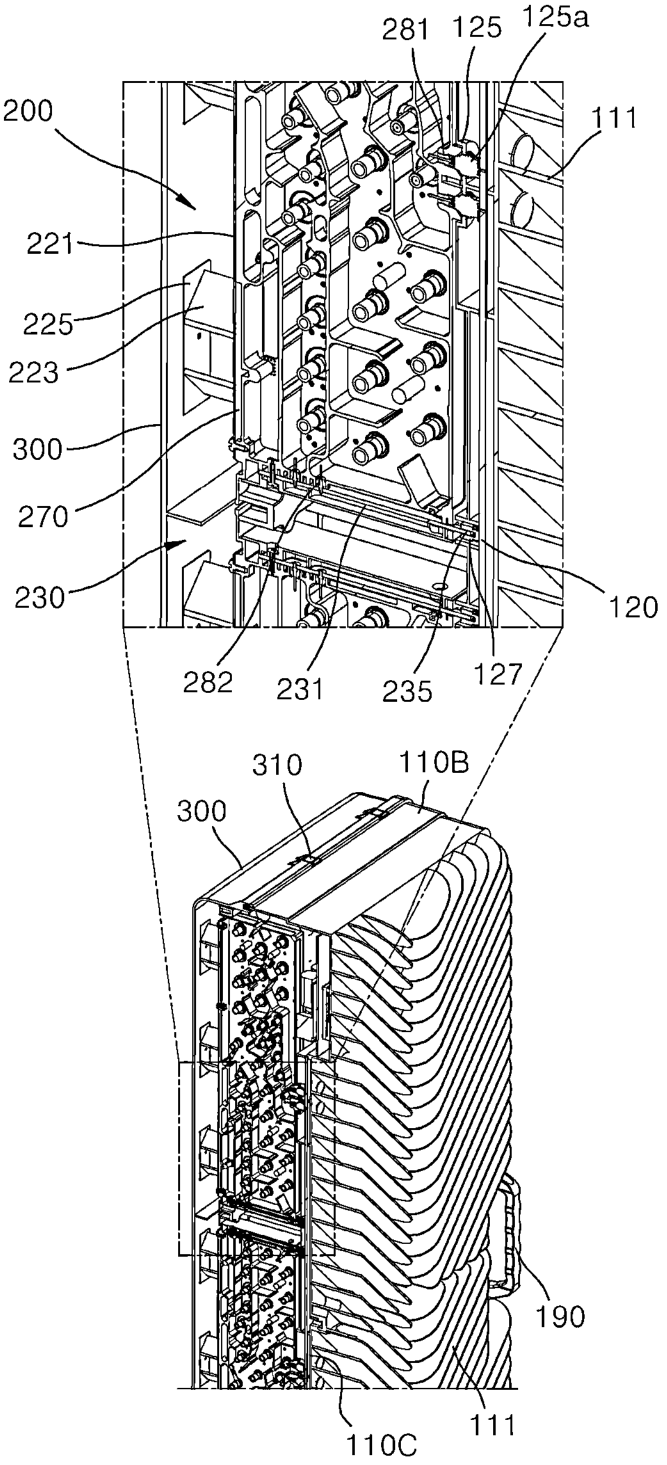
FIG. 20 is a cut-away perspective view and a partially enlarged view illustrating a state of connection between the first connecting pin terminal and the LNA substrate part in FIGS. 19A and 19B.

FIG. 17 is an exploded perspective view for explaining a coupling relationship between the amplification element part and the unit RF filter body among the components of the antenna RF module, FIG. 18 is a cut-away perspective view and a partially enlarged view illustrating a state of mutual electrical connection made by the second connecting pin terminal illustrated in FIG. 17, FIGS. 19A and 19B are exploded front and rear side perspective views and partially enlarged views for explaining a state of mutual electrical connection of the board assembly made by the first connecting pin terminal and the LNA substrate part illustrated in FIGS. 15A and 15B, and FIG. 20 is a cut-away perspective view and a partially enlarged view illustrating a state of connection between the first connecting pin terminal and the LNA substrate part in FIGS. 19A and 19B.

As illustrated in FIGS. 17 and 18, in the amplification element part 230, the LNA substrate part 231, on which at least one LNA element is mounted, may be accommodated and disposed in the substrate installation space 230S integrally formed in any one of the upper and lower surfaces of the unit RF filter body 210.

The substrate installation space 230S may have a through-slit 239 formed rearward through the unit RF filter body 210, and the male socket part 235 formed on the LNA substrate part 231 penetrates the through-slit 239 and is coupled, in a socket pin coupling manner, to the female socket part 127 provided on the main board 120, such that the electrical connection of the reception signal may be implemented.

In this case, only at least one LNA element, which serves to amplify the reception signal received through the left filter part 240A or the right filter part 240B from the radiating element part 220 among the analog amplification elements, may be mounted on the LNA substrate part 231, and at least one PA (Tx-amp) element, except for the LNA element mounted on the LNA substrate part 231, may be mounted on the main board 120.

Because the PA elements mounted on the main board 120 generate a relatively larger amount of heat than the LNA elements, the LNA elements may be designed to be distributed and arranged toward the RF module 200 separated from the main board 120, such that intervals between the heating elements mounted on the main board 120 may be increased, which may prevent the heat generated by the heating elements from concentrated and improve the overall heat radiation performance.

Meanwhile, with reference to FIGS. 17 and 18, the LNA substrate part 231 may be electrically connected to the cavities C1 and C2 of the left filter part 240A and the right filter part 240B formed at the left and right sides of the unit RF filter body 210 by means of the second connecting pin terminal 282 that is one of the components of the filter connecting part.

To this end, a pin installation hole (no reference numeral) may be formed in the unit RF filter body 210 and formed through the substrate installation space 230S, the cavity C1 of the left filter part 240A, and the cavity C2 of the right filter part 240B.

The second connecting pin terminal 282 may be installed while penetrating the pin installation hole and then fixed to the LNA substrate part 231 by solder in a coupling manner such as soldering.

As described above, the antenna RF module 200 according to the embodiment of the present invention has an advantage capable of maintaining the PIM properties by solving the problem of the unintended movement and clearance of the internal components that may occur because of a low coupling force of the first connecting pin terminal 281 and the LNA substrate part 231 to the main board 120 by the male socket part 235, and the antenna RF module 200 has an advantage capable of maintaining the stable PIMD properties by fixing the first connecting pin terminal 281, the second connecting pin terminal 282, and the third connecting pin terminal 283 by soldering. However, all the filter connecting parts do not need to be necessarily fixed by soldering. Among the filter connecting parts, the first connecting pin terminal 281 may be kept stably coupled by the fixing member 280, such that the first connecting pin terminal 281 may be designed to be coupled to the pin coupling part 125 of the board assembly in a one-touch coupling manner.

More specifically, as illustrated in FIGS. 19A and 19B, the first connecting pin terminal 281 is provided in a groove shape (female shape among the male-female coupling methods) on the rear surface portion of the unit RF filter body 210, and the pin coupling part 125 may be provided in a protrusion shape (male shape among the male-female coupling methods) on the front surface of the main board 120 among the components of the board assembly.

In addition, the male socket part 235, which is formed on the LNA substrate part 231 of the amplification element part 230 provided on the upper or lower portion of the unit RF filter body 210, may be provided to protrude rearward, and the female socket part 127 may be provided in a socket shape on the front surface of the main board 120 among the components of the board assembly.

In this case, the RF module 200 approaches the fixing member 280 as an assembler individually seats the RF module 200 on the fixing member 280 through the opened front side of the antenna housing part 110, the male socket part 235 and the first connecting pin terminal 281 of the LNA substrate part 231 are coupled in a one-touch manner to be simultaneously connected to the female socket part 127 and the pin coupling part 125 of the main board 120, and then the reflector panel 270 may be stably fixed by using the assembling screws 287. In this case, as illustrated in FIG. 20, the electrical connection between terminal members 125*a*, such as coaxial connectors of the first connecting pin terminal 281 and the pin coupling part 125, may be maintained.

Meanwhile, the antenna RF module 200 according to the embodiment of the present invention may further include a left tuning cover 250A and a right tuning cover 250B coupled to cover the cavities C1 and C2 at the left and right sides of the unit RF filter body 210, and a left filter cover 260A and a right filter cover 260B configured to shield the left tuning cover 250A and the right tuning cover 250B.

Tuning grooves 251 may be formed in the left tuning cover 250A and the right tuning cover 250B to precisely tune frequencies by adjusting a spacing distance from the resonators DR in the cavities C1 and C2.

In this case, the frequency filtering process in the cavities C1 and C2 of the unit RF filter body 210 needs to be performed in a state in which a fully sealed state is maintained. In case that the sealing is incomplete or sealing performance deteriorates as the time of use increases, the above-mentioned PIMD problem may occur.

In order to prevent the occurrence of the PIMD problem, the left filter cover 260A and the right filter cover 260B including the left tuning cover 250A and the right tuning cover 250B may be attached to the unit RF filter body 210 by laser welding.

The embodiment of the antenna RF module and the antenna apparatus including the same according to the present invention has been described above in detail with reference to the accompanying drawings. However, the present invention is not necessarily limited by the embodiments, and various modifications of the embodiments and any other embodiments equivalent thereto may of course be carried out by those skilled in the art to which the present invention pertains. Accordingly, the true protection scope of the present invention should be determined by the appended claims.

INDUSTRIAL APPLICABILITY

The present invention provides the antenna apparatus that has the left filter part and the right filter part in which the filter part, the radiating element part, and the amplification part are manufactured as the single module unit, and the fixing member is further provided, which may solve the general PIMD problem of the antenna apparatus and perform independent frequency filtering at the left and right sides of the unit RF filter body, such that the productivity of the dual band filter may be improved. Further, among the heating elements of the antenna apparatus, the LNA element, which generates a relatively small amount of heat and is provided in the reception signal path that does not affect the entire system, is provided and disposed to be separated from the main board, which may improve the overall heat radiation performance.

The invention claimed is:

1. An antenna apparatus comprising:

an antenna housing part formed in a form of an enclosure opened at a front side thereof;

a board assembly disposed to be tightly attached to an internal space defined by the antenna housing part; and a plurality of antenna RF modules arranged on a front surface of the board assembly, wherein the antenna housing part comprises three separate and independently manufactured heat sink panels including an upper heat sink panel, a center heat sink panel, and a lower heat sink panel, the three heat sink panels being vertically elongated and arranged in an upper, center, and lower order along a vertical direction, the upper heat sink panel and the lower heat sink panel being respectively coupled to upper and lower portions of the center heat sink panel via corresponding coupling flanges to form a vertically segmented housing structure.

2. The antenna apparatus of claim 1, wherein each of the three heat sink panels is formed such that a length of a vertical side is at least longer than a length of a horizontal side by a predetermined ratio or higher.

3. The antenna apparatus of claim 1, wherein the center heat sink panel is configured to define an external appearance of an intermediate portion of a rear surface of the antenna apparatus;

the upper heat sink panel is configured to define an external appearance of an upper portion of the rear surface of the antenna apparatus; and the lower heat sink panel is configured to define an external appearance of a lower portion of the rear surface of the antenna apparatus.

4. The antenna apparatus of claim 1, wherein the corresponding coupling flanges comprise an upper coupling flange and a lower coupling flange, which have a plurality of screw through-holes for screw assembling with the upper heat sink panel and the lower heat sink panel, the upper coupling flange and the lower coupling flange being provided at upper and lower ends of the center heat sink panel, and wherein the upper coupling flange and the lower coupling flange are coupled to the upper heat sink panel and the lower heat sink panel by using a plurality of assembling screws in a state in which the upper coupling flange is in contact with a lower end of a rear surface of the upper heat sink panel and the lower coupling flange is in contact with an upper end of a rear surface of the lower heat sink panel.

5. The antenna apparatus of claim 4, wherein the upper coupling flange and the lower coupling flange are disposed to respectively overlap the lower end of the rear surface of the upper heat sink panel and the upper end of the rear surface of the lower heat sink panel in a forward/rearward direction and positioned relatively forward of the lower end of the rear surface of the upper heat sink panel and the upper end of the rear surface of the lower heat sink panel.

6. The antenna apparatus of claim 4, wherein the upper coupling flange and the lower coupling flange are disposed to be respectively recessed toward the inside of the lower end of the rear surface of the upper heat sink panel and the inside of the upper end of the rear surface of the lower heat sink panel.

7. The antenna apparatus of claim 1, wherein a coupling portion between the center heat sink panel and the upper heat sink panel and a coupling portion between the center heat sink panel and the lower heat sink panel are subjected to waterproof treatment.

8. The antenna apparatus of claim 1, wherein the plurality of antenna RF modules has a plurality of unit RF filter bodies disposed side by side in several rows or several columns in a vertical upward/downward direction (hereinafter, referred to as a 'V-direction') and a horizontal leftward/rightward direction (hereinafter, referred to as an 'H-direction'), and wherein the antenna apparatus further comprises a plurality of fixing members configured to mediate fixing of the antenna RF module to the antenna housing part.

9. The antenna apparatus of claim 8, wherein the plurality of fixing members comprises:

a horizontal fixing bar configured to provide module fixing screw holes to which the plurality of unit RF filter bodies is fixed in a screw coupling manner; and a plurality of fixing legs extending rearward from the horizontal fixing bar and each having a rear end fixed to a front surface of the antenna housing part or the board assembly.

10. The antenna apparatus of claim 9, wherein one side fixing leg and the other side fixing leg, which are formed at two opposite ends among the plurality of fixing legs, are fixed, in a screw coupling manner, to an edge mounting block provided on an inner edge portion of the antenna housing part, and wherein a center fixing leg, which is formed between one side fixing leg and the other side fixing leg among the plurality of fixing legs, is fixed, in a screw coupling manner, to a board mounting block provided on the front surface of the board assembly.

11. The antenna apparatus of claim 9, wherein the plurality of antenna RF modules comprises:

the unit RF filter body;

a plurality of radiating element modules provided to protrude toward a front side of the unit RF filter body; and a reflector panel integrally formed at a front end of the unit RF filter body so as to have a larger area than a front surface of the unit RF filter body and configured to reflect radio waves, which are radiated from the plurality of radiating element modules, forward, and wherein the plurality of antenna RF modules is fixed by an operation of fastening a filter fixing screw, which is formed through the reflector panel from a front side to a rear side, to a module fixing screw hole of the horizontal fixing bar provided at a rear side of the reflector panel.

12. The antenna apparatus of claim 11, wherein the plurality of antenna RF modules further comprises:

an amplification element part provided on any one of upper and lower surfaces that are front and rear thickness portions of the unit RF filter body, the amplification element part comprising an LNA substrate part on which at least one analog amplification element is mounted; and a filter connecting part provided on a rear surface portion of the unit RF filter body and electrically connected to the board assembly, and wherein a male socket part, which is formed on the LNA substrate part, and the filter connecting part are simultaneously connected to a pin coupling part and a female socket part provided on the front surface of the board assembly when the unit RF filter body is fixed to the horizontal fixing bar by screw fastening.

13. The antenna apparatus of claim 9, further comprising:

a radome panel coupled to the front surface of the antenna housing part to shield an opened front side of the antenna housing part, wherein a plurality of support bosses is formed on a rear surface of the radome panel and extends and protrudes rearward to support a front end of the horizontal fixing bar.

14. The antenna apparatus of claim 13, wherein the plurality of fixing members is supported by the plurality of support bosses of the radome panel in a state in which a buffer part made of a silicone rubber material is interposed between the plurality of fixing members and the rear surface of the radome panel.

15. The antenna apparatus of claim 8, wherein the antenna housing part further comprises four side housing panels respectively connected to front ends of the center heat sink panel, the upper heat sink panel, and the lower heat sink panel and configured to define external appearances of left and right side portions and upper and lower side portions of the antenna apparatus, and wherein the plurality of fixing members comprises a horizontal fixing bar having two opposite ends respectively fixed to inner surfaces of left and right housing panels configured to define an external appearance of a left portion and an external appearance of a right portion of the antenna apparatus among the four side housing panels.

16. The antenna apparatus of claim 15, wherein the four side housing panels and the radome panel are made of the same material.

17. The antenna apparatus of claim 1, wherein a plurality of rear heat radiating fins is provided on rear surfaces of the center heat sink panel, the upper heat sink panel, and the lower heat sink panel to increase a heat radiation surface area of heat generated from the heating elements in the internal space, and wherein at least some of the plurality of rear heat radiating fins are separately manufactured and coupled to coupling heat sink ribs integrally formed on rear surface portions of the heat sink panels.

* * * * *